United States Patent
Suder et al.

(10) Patent No.: US 8,391,298 B2
(45) Date of Patent: Mar. 5, 2013

(54) PHONE DIRECTORY IN A VOICE OVER IP TELEPHONE SYSTEM

(75) Inventors: Eric G. Suder, Plano, TX (US); Harold E. A. Hansen, II, Plano, TX (US)

(73) Assignee: Estech Systems, Inc., Plano, TX (US)

( * ) Notice: Subject to any disclaimer, the term of this patent is extended or adjusted under 35 U.S.C. 154(b) by 3439 days.

(21) Appl. No.: 10/447,607

(22) Filed: May 29, 2003

(65) Prior Publication Data

US 2004/0062235 A1    Apr. 1, 2004

Related U.S. Application Data

(63) Continuation-in-part of application No. 09/775,018, filed on Feb. 1, 2001, now Pat. No. 7,068,684.

(51) Int. Cl.
*H04L 12/56* (2006.01)
*H04M 11/00* (2006.01)

(52) U.S. Cl. ................. 370/401; 379/93.17

(58) Field of Classification Search ............. 379/93.23, 379/354, 355.02, 355.04, 90.01
See application file for complete search history.

(56) References Cited

U.S. PATENT DOCUMENTS

| | | | |
|---|---|---|---|
| 6,065,016 A * | 5/2000 | Stuntebeck et al. | 707/200 |
| 6,094,674 A * | 7/2000 | Hattori et al. | 709/203 |
| 6,298,057 B1 * | 10/2001 | Guy et al. | 370/389 |
| 6,396,531 B1 * | 5/2002 | Gerszberg et al. | 348/14.01 |
| 6,446,127 B1 * | 9/2002 | Schuster et al. | 709/227 |
| 6,829,231 B1 * | 12/2004 | Wilson | 370/352 |
| 7,047,287 B2 * | 5/2006 | Sim et al. | 709/221 |
| 7,349,967 B2 * | 3/2008 | Wang | 709/227 |
| 2001/0037331 A1 * | 11/2001 | Lloyd | 707/4 |

* cited by examiner

*Primary Examiner* — Gregory Sefcheck
(74) *Attorney, Agent, or Firm* — Kelly Kordzik; Matheson Keys & Kordzik PLLC

(57) ABSTRACT

In a Voice over IP system, a user can dial numbers stored in a series of lists, which are stored in the system and displayed to the user of an IP telephone. One implementation will allow a user to scroll through a list of remote sites. When the user finds the desired site, the user is then presented with the same options as a user local to that site. All of this can be performed without the need for an operator or a printed directory. This system provides an ability for a user to scroll through a list of names and phone numbers and then call a person once their name and phone number is displayed.

19 Claims, 19 Drawing Sheets

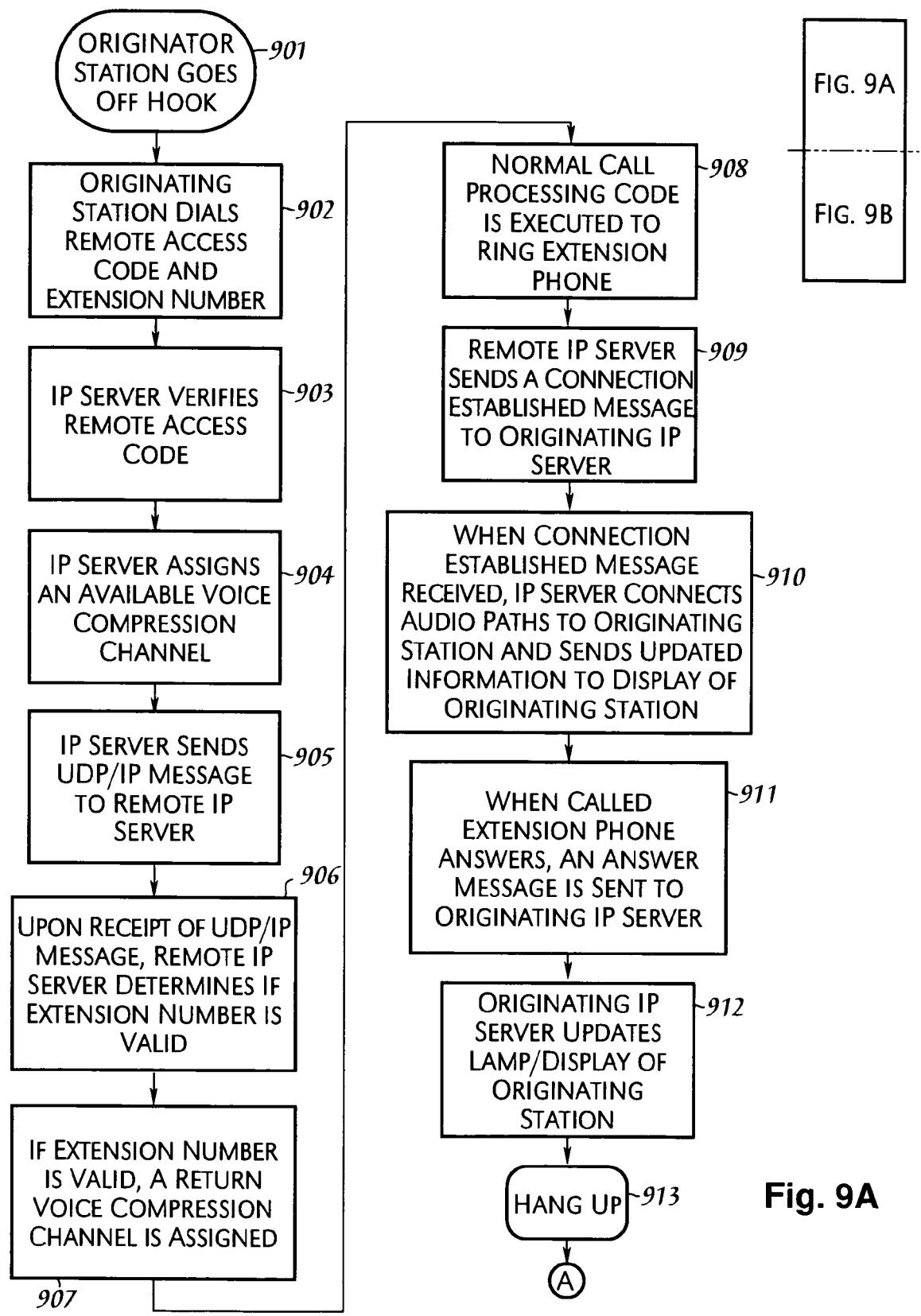

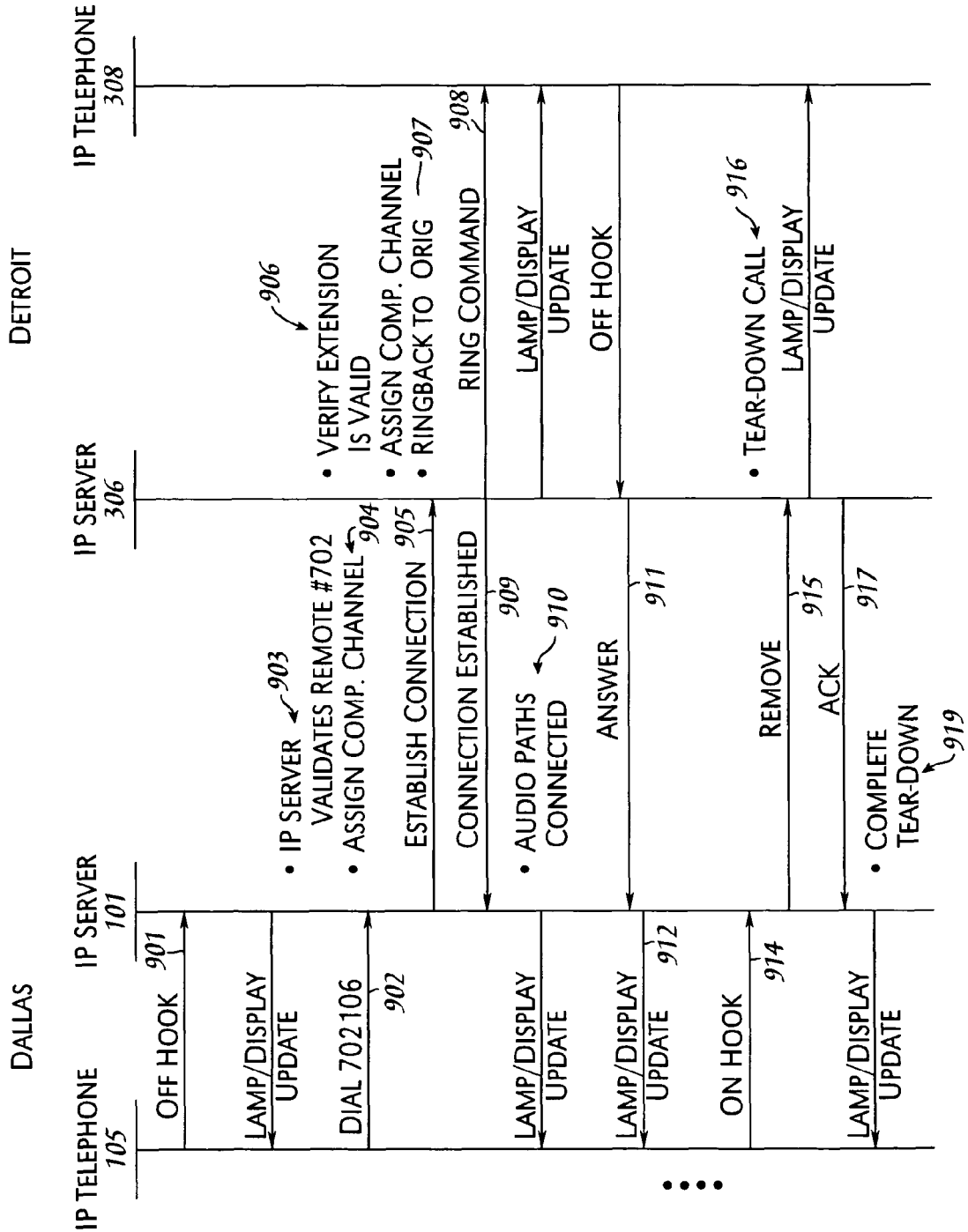

Fig. 14  SITE DEX MESSAGE FLOW

PHONE DIRECTORY IN A VOICE OVER IP TELEPHONE SYSTEM

CROSS REFERENCE TO RELATED APPLICATIONS

This application for patent is a continuation-in-part application of U.S. patent application Ser. No. 09/775,018, filed Feb. 1, 2001 now U.S. Pat. No. 7,068,684 entitled "QUALIFY OF SERVICE IN A VOICE OVER IP TELEPHONE SYSTEM."

This application for patent is related to the following patent applications:

Ser. No. 10/072,343: entitled "QUALITY OF SERVICE IN A REMOTE TELEPHONE";

Ser. No. 10/041,332, now U.S. Pat No. 6,925,167; entitled "SERVICE OBSERVING IN A VOICE OVER IP TELEPHONE SYSTEM"; and Ser. No. 10/210,902, now U.S. Pat. No. 7,123,699; entitled "VOICE MAIL IN A VOICE OVER IP TELEPHONE SYSTEM"; which are all hereby incorporated by reference herein.

TECHNICAL FIELD

The present invention relates in general to information processing systems, and in particular, to the use of Voice over IP technology to transmit voice conversations.

BACKGROUND INFORMATION

Voice over IP ("VoIP") is a relatively recent development that is utilized to transmit voice conversations over a data network using the Internet Protocol ("IP"). Such a data network may be the Internet or a corporate intranet, or any IP network. There are several potential benefits for moving voice over a data network using IP. First, there is a savings in money compared to the need to use traditional tolled telecommunications networks. Additionally, Voice over IP enables the management of voice and data over a single network. And, with the use of IP phones, moves, adds and changes are easier and less expensive to implement. Moreover, additional and integrated new services, including integrated messaging, bandwidth on demand, voice e-mails, the development of "voice portals" on the Web, simplified setting up and tearing down, and transferring of phone calls are capable.

Using Voice over IP technology, phone systems can communicate with each other over existing IP data networks typically present between remote offices. This feature alone can eliminate the need for expensive, dedicated circuits between facilities. The shared bandwidth can also be used for voice calls and data communication simultaneously; no bandwidth is dedicated to one or the other.

Another advantage of a Voice over IP system is the ability to implement a phone system over an existing data network that is already connecting workstations within a local area network, such as over an Ethernet. An Ethernet operates over twisted wire and over coaxial cable for connecting computers, printers, workstations, terminals, servers, etc., within the same building or a campus. The Ethernet utilizes frame packets for transmitting information. Voice over IP can utilize such packet switching capabilities to connect IP phones onto the Ethernet.

BRIEF DESCRIPTION OF THE DRAWINGS

For a more complete understanding of the present invention, and the advantages thereof, reference is now made to the following descriptions taken in conjunction with the accompanying drawings, in which:

FIGS. 9A-9B illustrate a flow diagram of call processing over a configuration in accordance with the present invention;

FIG. 10 illustrates a message flow diagram corresponding to an embodiment of the present invention;

DETAILED DESCRIPTION

Figure 1:
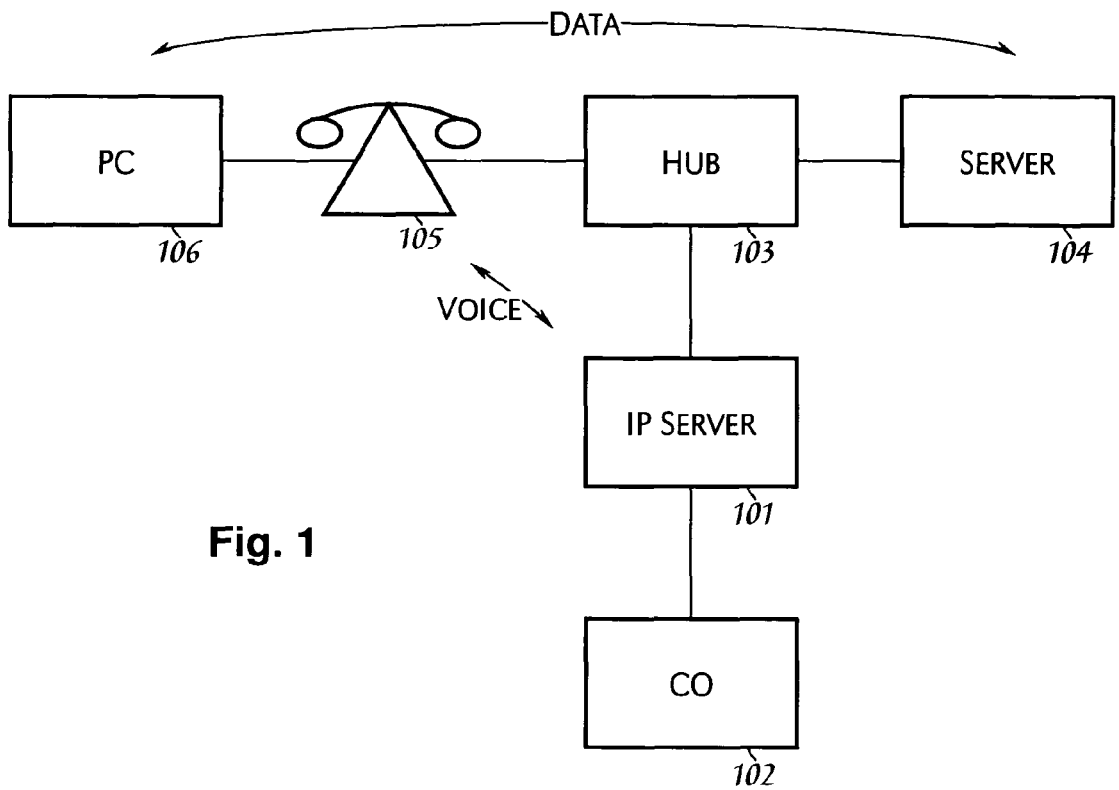
FIG. 1 illustrates an information processing system.

In the following description, numerous specific details are set forth such as specific network configurations, network devices, types of multimedia traffic, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates an information processing system configured in accordance with the present invention. FIG. 1 essentially illustrates a local area network ("LAN"), which in one configuration could be implemented with an Ethernet protocol. However, the present invention is not limited to use with any particular data transfer protocol. Workstation PC 106, network hub 103 and server 104 coupled to each other illustrate a typical LAN configuration where data is communicated between the workstation 106 and the server 104. Naturally, other workstations and servers could also be coupled to the LAN through hub 103, including the use of additional hubs. Hub 103 may be a 10 Base T or 10/100 Base T Ethernet hub. In an alternative embodiment, the hub 103 and server 104 may be implemented in the same data processing system. Herein, the term "workstation" can refer to any network device that can either receive data from a network, transmit data to a network, or both.

To add in the voice communication capabilities, an IP multimedia server 101 is coupled to hub 103 and an IP telephony device 105 is connected between the workstation 106 and the hub 103. Workstation 106 may be optional. The IP multimedia server 101 is coupled to a central office ("CO")

102 so that telephony device 105 can communicate to other telecommunications networks, such as the public switched telephone network ("PSTN"). Naturally, additional IP telephony devices 105 can be coupled to hub 103, including having workstations coupled to hub 103 through such IP telephony devices. Further details on multimedia server 101 and IP telephony device 105 are described below. An IP telephone, or telephony device, is any apparatus, device, system, etc., that can communicate multimedia traffic using IP telephony technology. IP telephony is defined within Newton's Telecom Dictionary, Harry Newton, Sixteenth Edition, page 454, which is hereby incorporated by reference herein. Information, or data, on the network includes both the voice and data information, and any other multimedia traffic. However, an IP telephone is not limited to the configurations described herein. For example, all of the functionality of the present invention can be implemented in a workstation.

Figure 2:
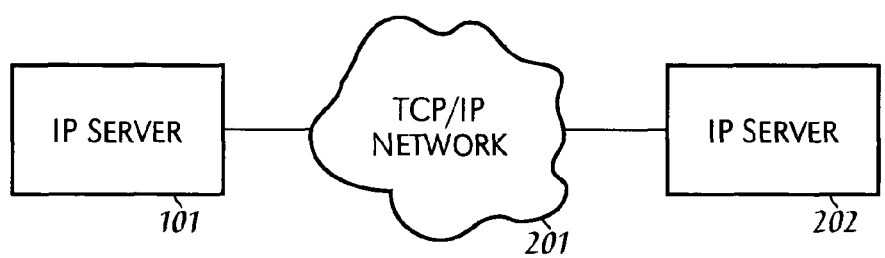
FIG. 2 illustrates a wide area network ("WAN")

FIG. 2 illustrates how the information processing system of the present invention as noted above with respect to FIG. 1 can be implemented across a wide area network ("WAN") 201 where the multimedia server 101 of FIG. 1 is coupled to another multimedia server 202 across LAN 201. Note that the other items described above in FIG. 1 have been omitted in FIG. 2 for the sake of simplicity.

Figure 3:
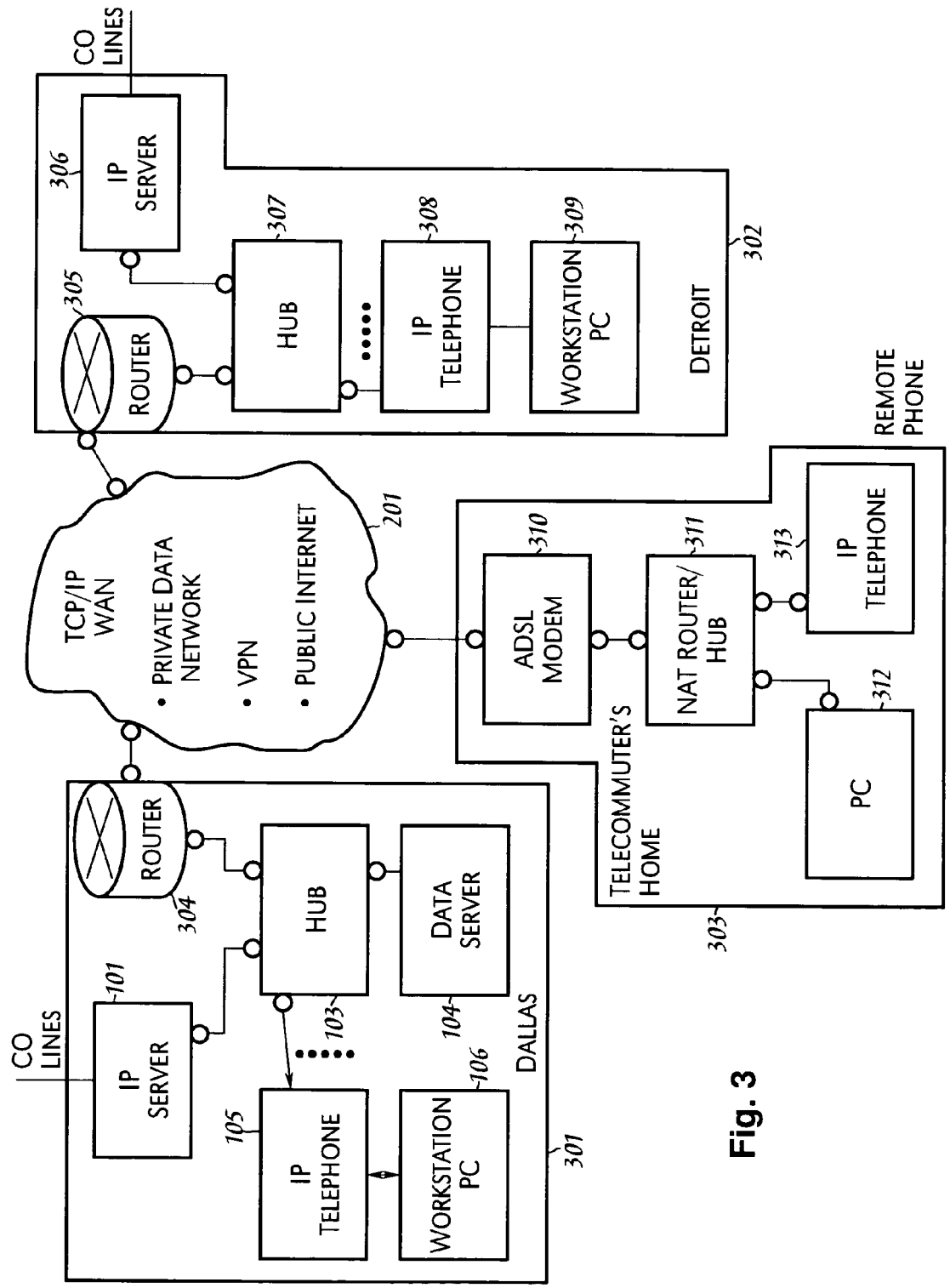
FIG. 3 illustrates another embodiment of a wide area network configuration.

FIG. 3 illustrates further detail of a configuration of the present invention over a WAN 201. Note that such a WAN may implement the IP protocol, and could be a public WAN, such as the Internet, a private data network, an intranet, a Virtual Private Network ("VPN"), or any external network.

FIG. 3 illustrates an exemplary system where WAN 201 couples an information processing system 301 in Dallas, Tex. to another information processing system 302 in Detroit, Mich., while also permitting a remote system 303 to couple to both systems 301 and 302 through WAN 201, such as from a telecommuter's home.

System 301 is similar to the system described above with respect to FIG. 1. System 301 is coupled to WAN 201 through router 304.

System 302 is similar to system 301 with the exception that a data server is not implemented within system 302. Router 305 is similar to router 304, multimedia server 306 is similar to multimedia server 101, hub 307 is similar to hub 103, IP telephony device 308 is similar to IP telephony device 105, and workstation 309 is similar to workstation 106.

Remote system 303 is coupled to WAN 201 using a modem 310, such as a cable modem or an ADSL (asymmetric digital subscriber line) modem. A NAT (Network Address Translation) router/hub 311 then couples a workstation PC 312 and an IP telephony device 313 to the modem 310. Not only can data be transferred across WAN 201 between systems 301-303, but also any one of telephony devices 105, 308 and 313 can communicate with each other and with the PSTN (not shown) over CO lines coupled to either of systems 301 and 302.

Figure 4:
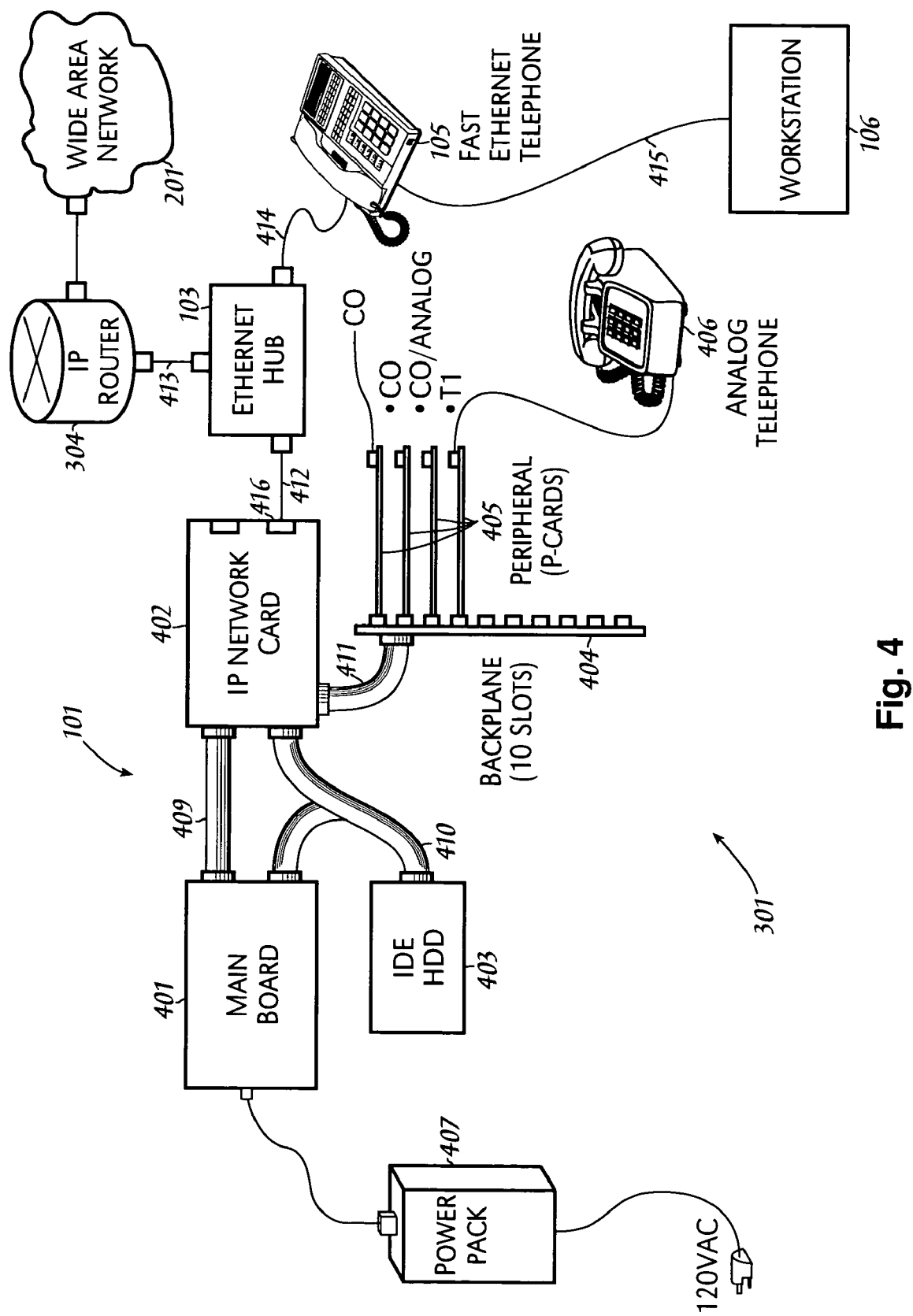
FIG. 4 illustrates a block diagram of a configuration of an embodiment of the present invention.

FIG. 4 illustrates further details of system 301. As noted above, system 301 is coupled to WAN 201 through IP router 304, which is coupled by line 413 to Ethernet hub 103. Ethernet hub 103 is connected by line 414 to fast Ethernet telephony device 105, which is coupled by line 415 to workstation 106. Ethernet hub 103 is coupled to IP network card 402 by connection 416, which may be a 10/100 Base T connector.

Multimedia server 101 is comprised of main board 401, network card 402, hard drive 403, backplane 404 and peripheral cards 405. Network card 402 is further discussed below in more detail with respect to FIG. 5. Network card 402 is coupled by ribbon cable 409 to main board 401, which is further described below in more detail with respect to FIG. 6.

Multimedia server 101 is powered through power pack 407. IDE (Integrated Drive Electronics) HDD (hard disk drive) 403 is coupled by ribbon cable 410 to network card 402 and main board 401, while network card 402 is coupled to backplane 404 through ribbon cable 411. Backplane 404 provides capacity for several peripheral cards (P-cards) 405, which are of a typical configuration for enabling a telephone system to connect to a central office (CO), Ti lines, analog central office trunks and analog telephones 406. Alternatively, ribbon cable 411 could be coupled to one of the peripheral cards 405 directly.

Figure 5:
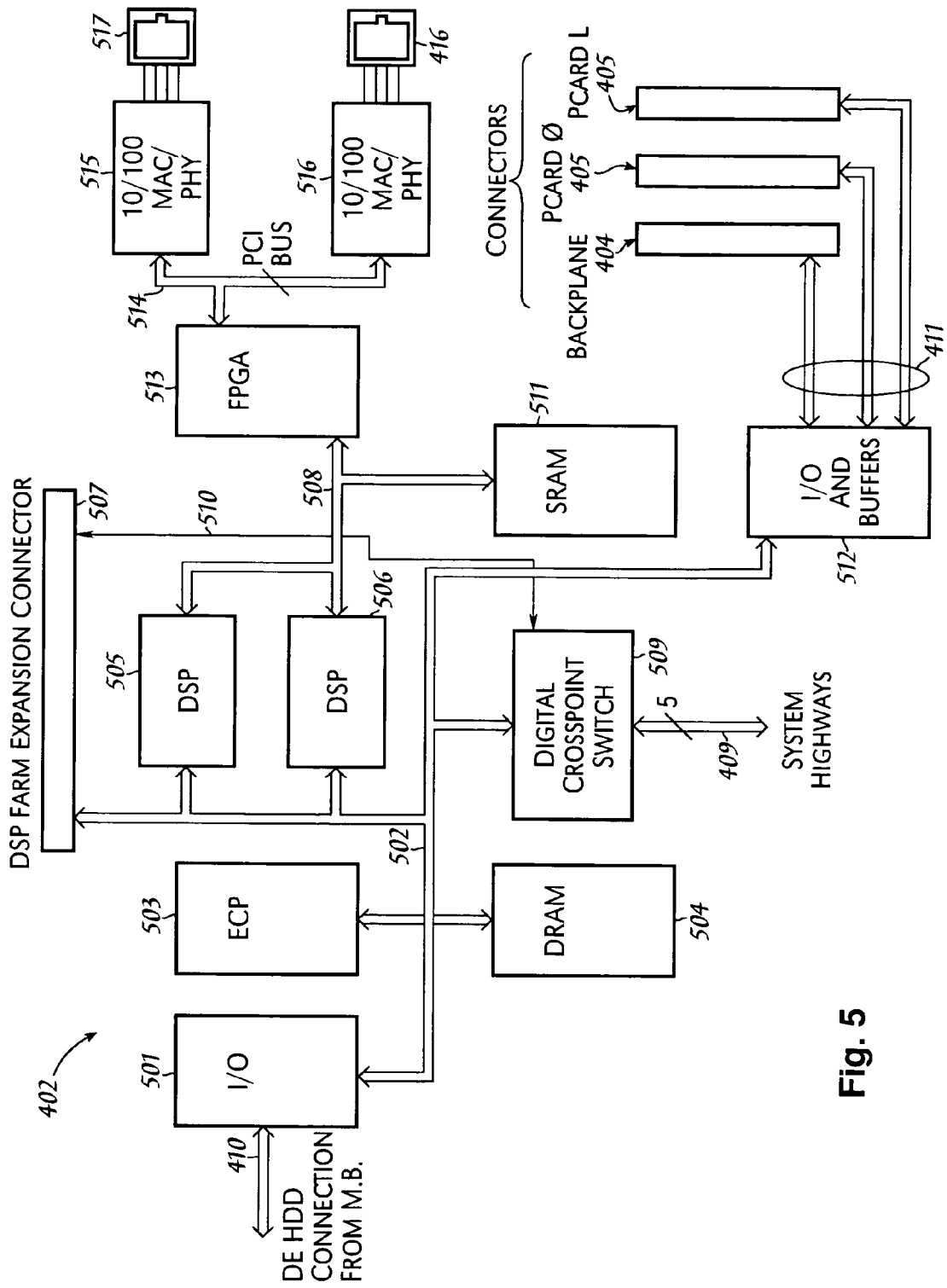
FIG. 5 illustrates a block diagram of a network card.

Referring next to FIG. 5, there is illustrated a block diagram of network card 402. Network card 402 is responsible for communicating with all IP telephones, remote telephones and remote sites via a 10/100 Base T connection. The higher-level communication protocol used may be a standard UDP/IP (User Datagram Protocol/Internet Protocol) protocol, or any other packet switching protocol. In addition, network card 402 communicates with the main board 401 for overall system control. Network card 402 has effectively replaced individual electronic key telephone circuits with a single Ethernet interface, and network card 402 now acts as the central distribution point for all peripheral cards 405, which can plug into backplane 404.

Ribbon cable 410 from hard drive 403 is received at I/O 501 coupled to bus 502. Bus 502 is coupled to ECP (Enhanced Call Processing) microcontroller 503, DRAM 504, DSPs 505 and 506, DSP farm expansion connector 507, digital cross-point switch 509, and I/O and buffers 512. ECP 503 is a microcontroller responsible for overall communications between network card 402 and main board 401. ECP 503 directly interfaces the DSPs 505, 506 via the host port interface. The host port interface is a parallel (8 bit) interface between the DSPs and the host processor. This interface can be used to directly manipulate the DSP memory by a host processor. I/O 501 is a mail box type parallel communication channel, which is multiplexed between communication with the IDE disk drive 403 and I/O 501 allowing direct control for functions such as firmware download and message passing. ECP 503 is based on a 16-bit Hitachi H8 family processor with built-in flash memory.

DSPs 505 and 506 can be implemented using Texas Instrument 5410 DSPs that perform packet encoding/decoding, jitter buffer management and UDP/IP protocol stacked functions. DSPs 505, 506 are connected to an external SRAM 511 and ASIC (FPGA) 513 that performs a PCI bridge function between bus 508 and bus 514, which is coupled to connectors 517 and 416 via 10/100 MAC/PHY devices 515 and 516. DSPs 505, 506 communicate with peripherals 405 via bus 502. DSP firmware is downloaded via the host port interface 501. I/O 501 allows communication with the main board 401 and the hard drive 403. Additionally, EPC 503 can directly control a daughter card containing additional DSPs through expansion connector 507 for functions such as speech compression.

Digital cross-point switch 509 is used to connect system voice conversations as needed between peripherals. Main board 401 houses the master cross-points with 616 discussed below with respect to FIG. 6. The peripheral cards 405 share a pool of 160 time slots. Cross-point switch 509 is primarily responsible for connecting the packet-switched voice connections of the IP telephones or remote systems to the circuit switchboard. The FPGA/PCI bridge 513 performs the functions required to connect the 10/100 Base T Ethernet MAC/PHY devices 515, 516. Since devices 515, 516 are designed to communicate via a standard PCI bus 514, the FPGA 513 implements a minimal PCI bus implementation. In addition, the FPGA 513 implements I/O latches and buffers as required.

The 10/100 Base T devices 515, 516 are stand-alone Ethernet devices, which perform the media access control ("MAC") and the Physical layer functions in a single, low-cost chip. Devices 515, 516 communicate to the host processor via a standard PCI bus 514, and communicate to the network via a pulse transformer coupled RJ-45 connection 517, 416. These devices contain FIFOs to minimize lost packets during traffic peaks. Per the PCI bus mastering specification, devices 515, 516 take control of the DSP bus and DMA data directly to SRAM 511. Conversely, the DSP 505, 506 writes data to be sent into the SRAM 511 and the devices 515, 516 DMA data via the PCI bus 514 to the network (LAN).

Figure 6:
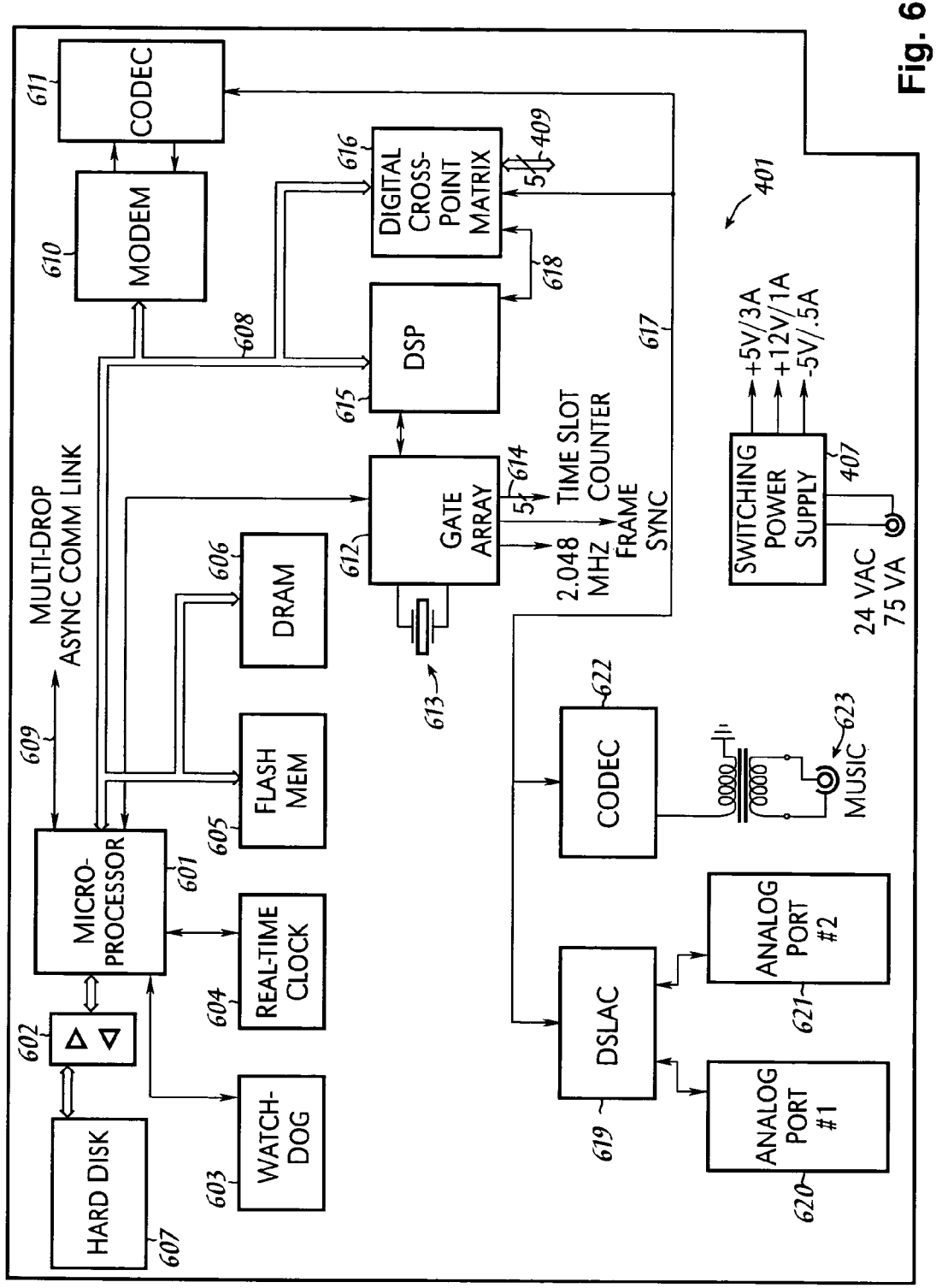
FIG. 6 illustrates a block diagram of main processing board.

Referring next to FIG. 6, there is illustrated, in block diagram form, main board 401 for integrating call processing and voice processing using a single processing means, which in this example is one microprocessor 601. Microprocessor 601, which may be a Motorola 68000 class microprocessor, communicates with hard disk 607 using driver circuitry 602. Hard disk 607 stores program data (such as programs run under the present invention), voice prompts, voice mail messages, and all other types of speech used within main board 401. Microprocessor 601 also includes watchdog timer 603 and real-time clock source 604.

Microprocessor 601 is coupled via bus 608 to flash memory 605 and dynamic random access memory ("DRAM") 606. Flash memory 605 is used to store bootstrap data for use during power up of main board 401. DRAM 606 stores the program accessed by microprocessor 601 during operation of main board 401.

Bus 608 also couples microprocessor 601 to signal processing circuitry, which in this example is digital signal processor ("DSP") 615. Digital signal processor 615 implements a number of functions traditionally implemented by discrete analog components.

Figure 13:
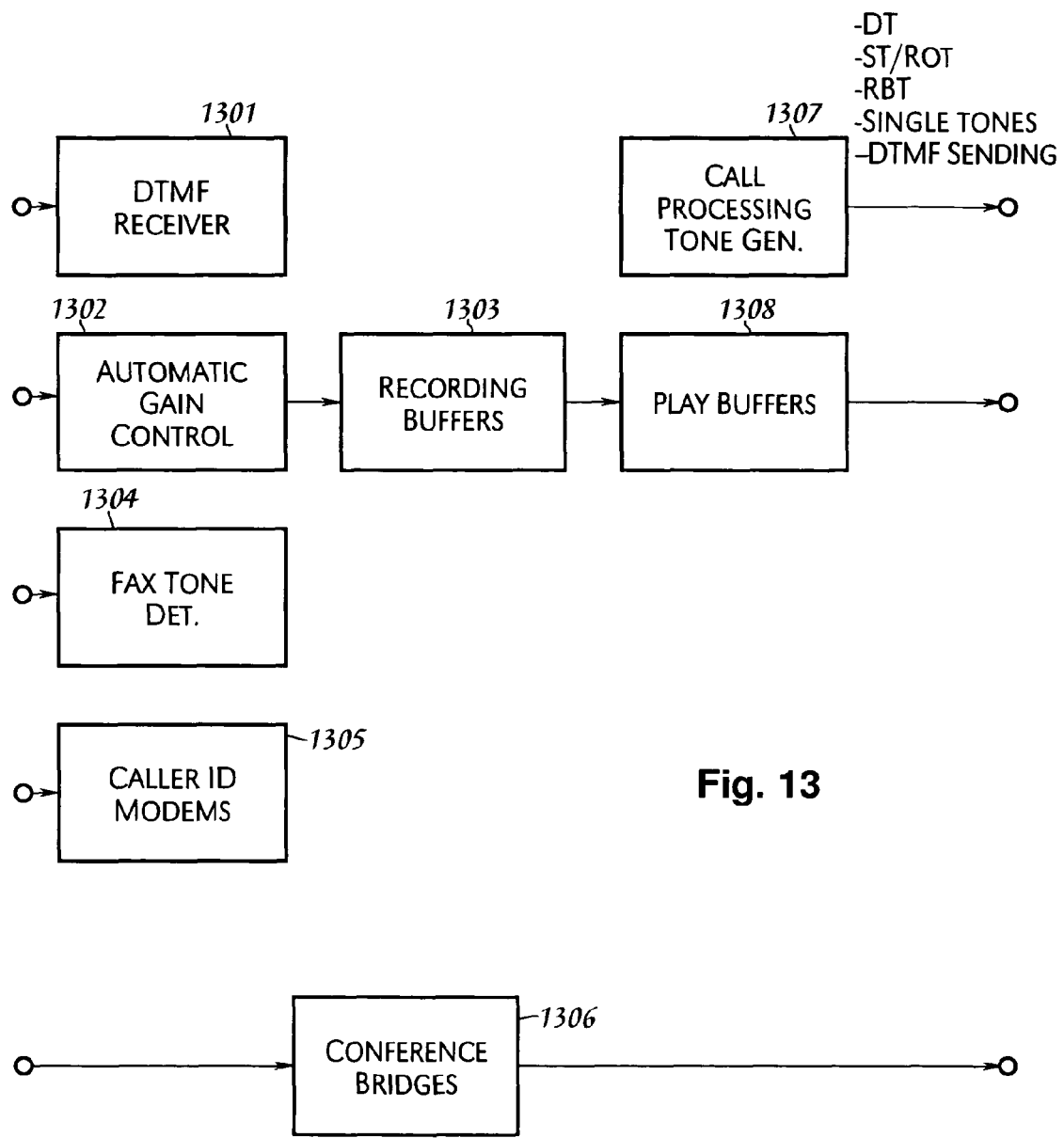
FIG. 13 illustrates functions implemented in the processing means of the main board.

Referring next to FIG. 13, there are illustrated some of the primary functions implemented in DSP 615. DTMF receivers 1301 are implemented using frequency domain filtering techniques. DTMF receivers 1301 detect all 16 standard DTMF (touch-tone) digits. Automatic gain control ("AGC") 1302 is a closed-loop gain control system, which normalizes received audio levels during recording. Recording buffers 1303, which are coupled to AGC 1302, receive and store speech samples after they have passed through AGC block 1302. These speech samples are converted to μ-law PCM (Pulse Code Modulation) and double buffered (several samples per buffer). Microprocessor 601 copies the record data out of DSP buffers 1303 into RAM buffers (not shown), which are located in the microprocessor 601 data RAM area. Fax tone detector 1304 is implemented using frequency domain filtering techniques. Fax tone detector 1304 detects the standard 1100 Hz FAX CNG tone (also referred to as the Calling Tone). Caller ID modems 1305 are 1200 baud FSK modems similar to Bell 202-type modems. Caller ID modems 1305 are implemented as a frequency discriminator where a time delayed (quadrature) signal is multiplied by the original signal, low pass filtered, then sliced, which produce the square wave caller ID data stream. Call processing tone generators 1307 are free running oscillators, which generate the appropriate tones (and tone pairs) which make up the industry standard call processing tones. These tones include:
- dial tone
- busy/reorder tone
- ring back tone
- single frequency (440 Hz) tone
- DTMF dialer tones Play buffers 1308 replay data from hard disk 607 through microprocessor 601 and place this play data in buffers 1308. This data is converted from an 8-bit μ-law PCM signal to 14-bit linear data. Conference bridges 1306 allow multiple conference bridges to mix together conferees into a multi-party conference. These conferees may be a mixture of inside and outside parties. A combination of "loudest speaker" and "summing" is utilized.

Returning to FIG. 6, DSP 615 communicates with microprocessor 601 via a host interface port ("HIP") via bus 608. The HIP link supports a command-based protocol, which is used to directly read or write DSP memory locations. DSP 615 is a RAM-based part and has its program downloaded from microprocessor 601. Once downloaded and running, microprocessor 601 (the host) polls for events or receives interrupts indicating that data is available. DSP 615 speech connections are made over an industry standard 32-time slot, 2.048 megabits per second (Mb/s) digital serial link 618. Link 618 occupies one of the digital highways implemented by digital cross-point matrix 616. Each service of DSP 615 occupies a single time slot. For example, DTMF receiver 1 occupies time slot 0 while conference bridge circuit 12 occupies time slot 31.

Digital cross-point matrix 616 is also coupled to bus 608 and operates to connect any voice path to any other voice path. Digital cross-point matrix 616 is a VLSI (Very Large Scale Integration) integrated circuit. An example of digital cross-point matrix 616 is manufactured by MITEL Semiconductor Corporation as part No. 8980. Digital cross-point matrix 616 communicates with microprocessor 601 via a memory mapped input/output (I/O) scheme. A command/control protocol is used for communication between microprocessor 601 and digital cross-point matrix 616 via bus 608. Cross-point matrix 616 is coupled by highway 618 to DSP 615. Cross-point matrix 616 is coupled to highway 617.

Digital cross-point matrix 616 is capable of making 256 simultaneous fully non-blocking connections. However, it may be upgraded by adding additional DSPs and/or cross-point matrices.

Gate array 612 is an SRAM (Static Random Access Memory) based device. An example of gate array 612 is manufactured by XILINX. Gate array 612 is responsible for generating all system timing. A master clock signal is provided by microprocessor 601 at 16.384 MHz. This clock signal is divided down to provide a number of phase coherent system clocks such as 4.096 MHz, 2.048 MHz and 8 KHz (frame sync). In addition, a 5-bit time slot counter is implemented which allows all the system CODECs to detect the appropriate time slot to use (0-31). An additional divider chain is included to divide the system clock down to 20 Hz, which is used by the ringing generator power supply (not shown).

Gate array 612 is downloaded at boot-up by system software. Gate array 612 is based on an SRAM architecture. That is, the internal fusible links commonly found in programmable logic are actually stored in volatile SRAM. Because of this architecture, gate array 612 is downloaded after power-up. Also, note the added flexibility of being able to modify the logic by simply loading new system software. Because the device is SRAM-based, it loses its programming when power is removed.

Bus 608 is also coupled to modem 610, which provides a capability of calling into system 401 on a remote basis to load additional programs, voice prompts, etc., or updates thereto, into hard disk 607. Modem 610 is coupled to coder/decoder ("CODEC") 611, which is coupled to highway 617. This connection allows coupling of modem 610 through cross-point matrix 616 to CO lines through bus 409 to the p-cards described with respect to FIG. 5.

Also coupled to highway 617 is dual subscriber line access chip (DSLAC) 619, which is well-known in the art, and which is coupled to analog ports 620 and 621, which provide an ability for system 401 to communicate to analog-type connections such as cordless telephones and fax machines.

Highway 617 is also coupled to CODEC 622, which is coupled to transformer 623 to a music source, which provides an ability to couple an external music source to a caller through cross-point matrix 616 for such things as providing the caller with music on hold.

Power to system 401 is provided through switching power supply 407, which converts AC to the various DC supply voltages needed by circuitry within system 401.

Figure 7:
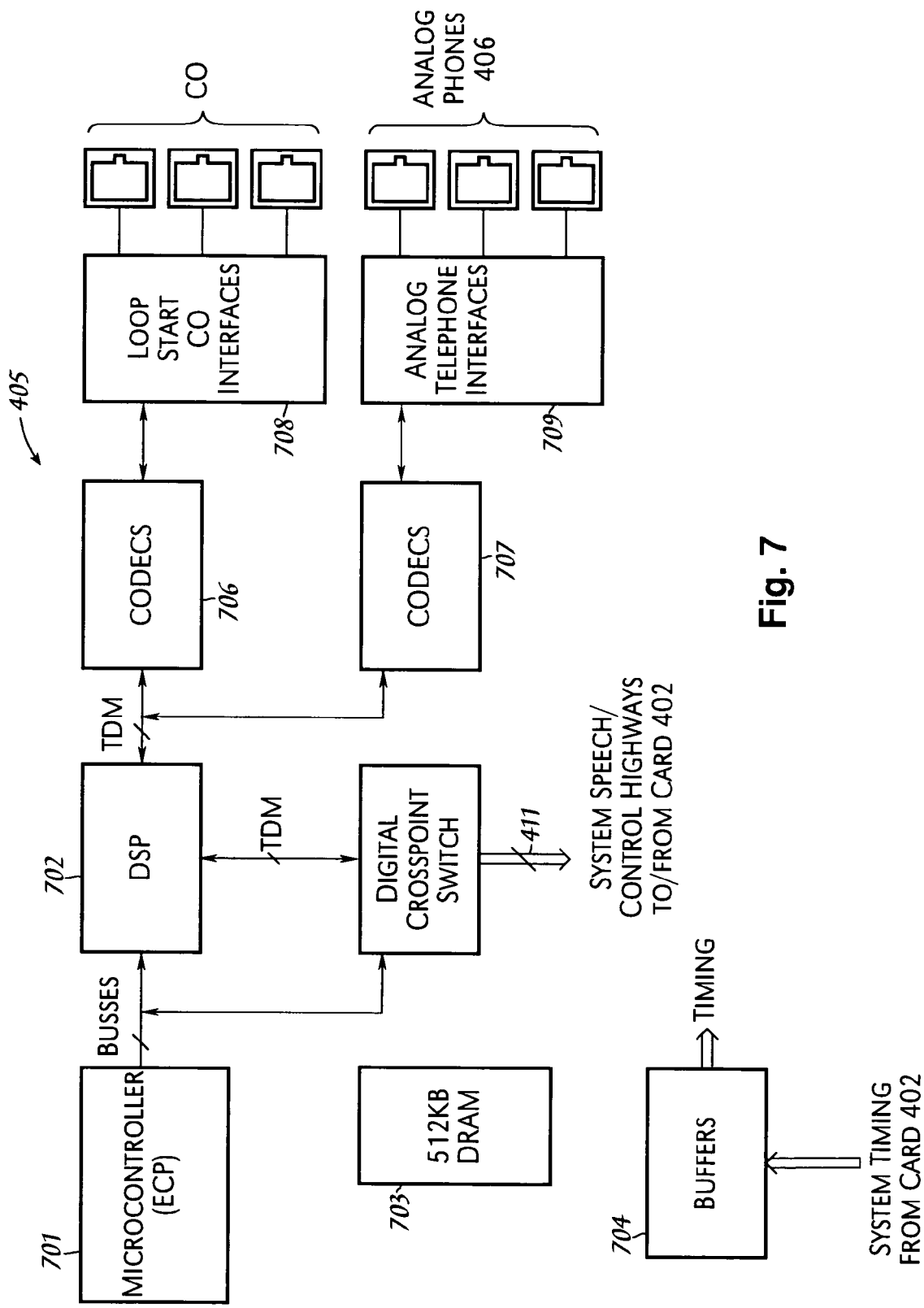
FIG. 7 illustrates a block diagram of a peripheral card.

Referring next to FIG. 7, there is illustrated peripheral-card ("p-card") 405, which is coupled to main board 401. Main board 401 communicates with p-card 405 via system speech/control highways 411. This connection 411 is made to microcontroller 701 via digital cross point switch 705. P-card 405 provides interconnections between CO lines and analog phone lines to network card 402.

Microcontroller 701 controls all the real-time functions associated with p-card 405. When p-card 405 is plugged into backplane 404, a card address is assigned to p-card 405. This card address is read by microcontroller 701 and is used to filter commands over communication link 411. When network card software wants to communicate with the specific p-card 405, the address is sent in the message packet which all p-cards 405 receive. P-cards 405 match the address in the message to the hard-wired address on the ribbon cable 411. If a match is made, only that p-card 405 responds to the command set.

Microcontroller 701 contains an internal program memory (not shown) and is connected to an external DRAM 703. The internal program memory contains a bootstrap program, which upon reset or power-up, requests a fresh firmware load from network card 402. This firmware load is transferred to DRAM 703. Upon download completion, the program is run from within DRAM 703. This scheme allows for microcontroller 701 firmware to be updated and loaded at any time.

Network card 402 sources all system timing through buffers 704. Timing signals to p-card 405 consists of a 2.048 MHz clock signal, an 8 KHz frame sync, which signifies the first time slot of a 32 time slot highway, and 5 time slot counter bits, which represent a binary count from 0 to 31.

As mentioned above, p-card 405 is assigned a card slot address when it is connected to network card 402. This card slot address is used to calculate which time slots p-card 405 should be using. The time slots used for the CO codecs 706 and analog phone codecs 707 are generated by buffers 704.

The loop start central office (CO) lines are supplied by the local telephone company and consist of a wet balanced differential audio pair. The term "wet" refers to the fact that a voltage of −48 volts is present on the pair. The system requests dial tone from the CO by providing a nominal 200 ohm loop across the TIP and RING conductors and releases the connection by opening the loop. The CO rings the system by placing a 90 vrms AC, 20 Hz sine wave on the TIP and RING conductors. The system seizes the line by going off hook.

Interfaces 708 incorporate a circuit that monitors the voltage present across TIP and RING of each CO. This line voltage monitor circuit serves to detect the ring voltage present during ringing (ring detection) and the unique feature of monitoring the CO line status for conditions such as whether the CO is plugged in or if someone is off hook in front of the system. The latter can be used to detect theft of service or allow a credit card verification terminal to be used without interfering with normal system operation.

The voltage monitor circuit consists of a balanced differential op-amp connected across TIP and RING of the CO lines through a very high impedance (>10M ohms). The output of the four voltage monitor op-amps are fed to an analog-to-digital converter with a built-in analog multiplexer (not shown). Microcontroller 701 firmware monitors the line voltages.

There is also a balanced differential AC coupled op amp across the CO TIP and RING to monitor the low level audio tones present during caller ID. The output of these op-amps are selected via an analog switch during the idle period and are connected to the CO line codec 706.

To correctly terminate the CO line (seizure) care must be taken to satisfy the DC loop requirements (~200 ohms) and the AC impedance requirements (~600 ohms). The classic approach has been to terminate TIP and RING with an inductor (called a holding coil) which has a large inductance (>1 Hy) and a DC resistance of ~200 ohms. The inductor separates the AC and DC components to give the desired effect. The problem is that the inductor must be large enough not to saturate with currents as high as 100 milliamps. An inductor which satisfies these requirements is physically cumbersome.

P-card 405 incorporates a solid state inductor circuit called a gyrator (not shown) to implement the holding coil function. This single transistor emulates an inductor with the above requirements while taking up very little PCB space.

A small solid state relay (not shown) is used as the hook switch. When energized, the gyrator holding coil is placed across TIP and RING closing the loop. The audio present on TIP and RING is AC coupled to a small dry transformer. The secondary of this transformer is connected to the AC termination impedance and to the codec 708, which may be implemented on a dual subscriber line access chip ("DSLAC").

High voltage protection is provided for all paths on the TIP and RING connections. These paths include TIP to RING, TIP to GROUND, RING to GROUND, and TIP and RING to GROUND. This high voltage protection is accomplished by first passing the TIP and RING conductors through positive temperature coefficient varistors (not shown). These varistors act as resettable fuses. When excessive current flows through these varistors, they become resistive thus limiting the current flow. When the excessive current is stopped, the original resistance is restored.

Figure 8:
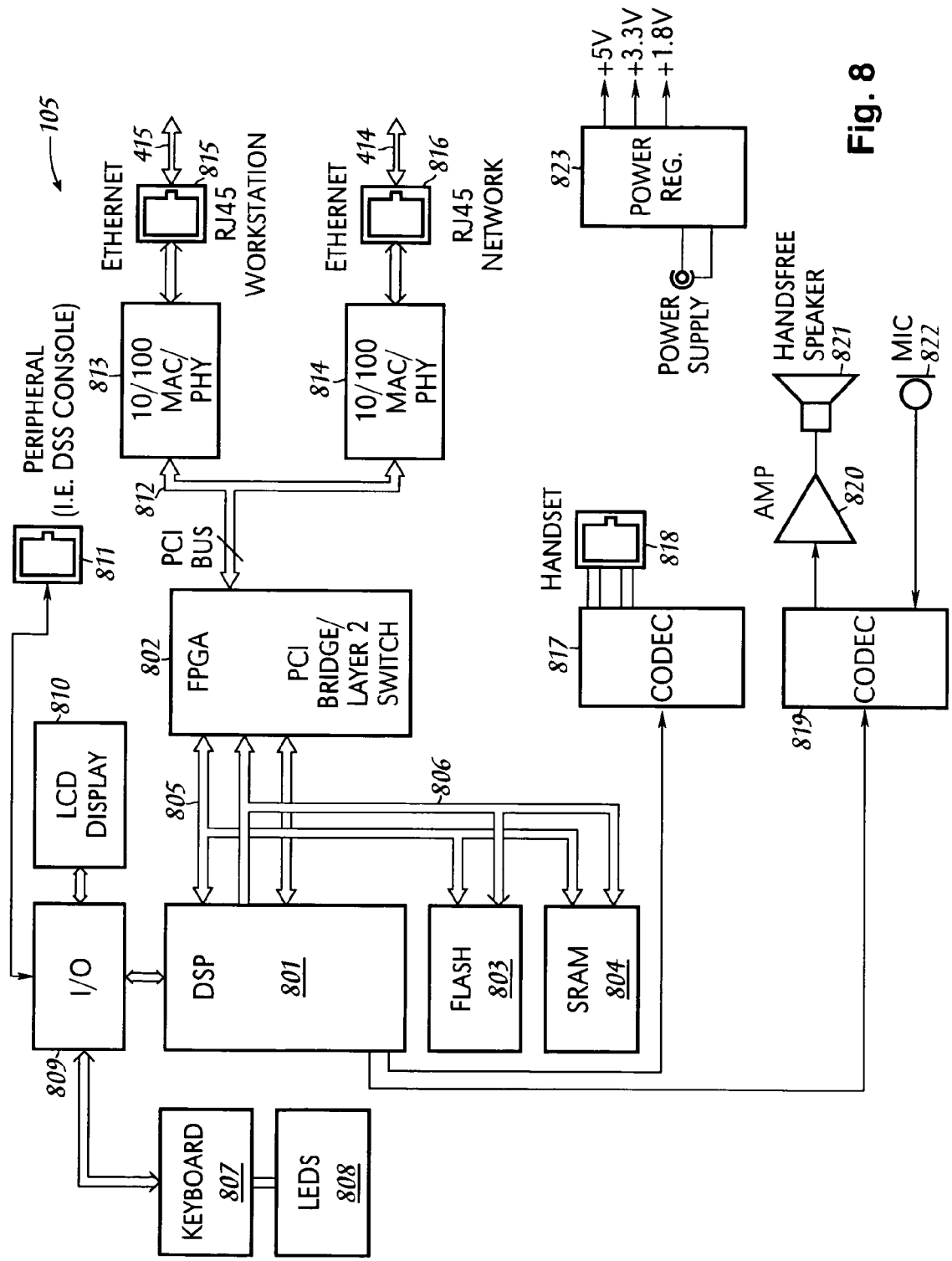
FIG. 8 illustrates a block diagram of a telephony device.

Referring to FIG. 8, there is illustrated a block diagram of further detail of IP telephony device 105. IP telephony device 105 may be a DSP based telephone instrument. Telephony device 105 communicates with the multimedia server 101 via the UDP/IP Protocol. Physical connection to the LAN is via an Ethernet 10/100 Base T interface. IP telephony device 105 contains the ability to perform layer-2 switching between two Ethernet ports in the telephony device for total control over voice versus data quality of service in accordance with the present invention. Speech samples are digitized, stored in 16 millisecond long packets and transmitted to the multimedia server 101 via the UDP/IP Protocol. As packets are received, they are triple-buffered to compensate for jitter before playback.

Connection 415 from workstation 106 is received by Ethernet RJ-45 connector 815, which is coupled to MAC/PHY device 813. Connection 414 between hub 103 and telephony device 105 is connected to RJ-45 connector 816, which is coupled to MAC/PHY device 814. Devices 813 and 814 are coupled by PCI bus 812 to FPGA/PCI bridge 802.

DSP 801 may be a Texas Instruments Model 5402 DSP; DSP 801 can be the only processor implemented within telephony device 105. DSP 801 performs typical DSP audio algorithms such as tone generation, gain, speaker phone algorithms, and energy detection. In addition, DSP 801 acts as a standard control processor performing such tasks as scanning the keyboard 807, lighting LED lamps 808, displaying LCD messages on LCD 810, performing UDP/IP stack functions, and communicating with devices 813, 814 via the PCI bus 812. Note that DSP 801 communicates with keyboard 807, LEDs 808, LCD display 810, and peripheral connection 811 by I/O device 809 in a typical manner. Peripheral connection 811 permits a coupling of DSP 801 to a DSS console. A DSS console may be a stand-alone device, which connects to the IP telephony device 105 to provide 64 individual LED lamps and keys. The lamps can be programmed by the user to monitor the status of individual stations, trunks or features. Pressing the key will access the associated function. Each telephony device in the system can connect to a DSS console. The DSS console communicates with the IP telephony device 105 via a 9600 baud serial communication link. The IP telephony device 105 does not contain a serial UART device, so the serial data protocol is controlled by software running in DSP 801. Physical connection between the telephony device and DSS console may be via a standard two pair modular line cord.

DSP 801 is coupled to an external FLASH memory 803 and a fast SRAM 804, and FPGA 802 via buses 805 and 806.

CODEC 817 and CODEC 819 perform analog to digital and digital to analog conversion of speech signals. CODEC 817 is connected to the handsets, speaker and microphone elements (not shown) via connector 818, while CODEC 819 is connected to the hands-free speaker 821 through amplifier 820, and to the hands-free microphone 822. Separating the functionality in this way permits the IP telephony device 105 to send tones or voice to one speaker while allowing a normal conversation over the other.

FPGA/PCI bridge 802 performs the functions required to connect telephone 105 to the 10/100 Base T Ethernet devices 813, 814. Since devices 813, 814 are designed to communicate via a standard PCI bus 812, the FPGA 802 implements a minimal PCI bus implementation. In addition, the FPGA 802 implements I/O latches and buffers as required.

Devices 813, 814 perform the Media Access Control and the Physical layer functions. Devices 813, 814 communicate to DSP 801 via a standard PCI bus 812, and communicate to the LAN via post-transformer coupled RJ-45 connections 815, 816. Devices 813, 814 can contain FIFOs to minimize lost packets during traffic peaks. Per the PCI bus mastering specification, devices 813, 814 take control of the buses 805, 806 and direct memory access (DMA) data directly to SRAM 804. Conversely, DSP 801 writes data to be sent into the SRAM 804 and the devices 813, 814 DMA the data via the PCI bus 812 to the LAN.

An embodiment of the present invention permits a user at a remote site to easily scroll through a phone listing of users throughout the WAN 201. For example, referring to FIG. 3, using either a workstation 106 or an IP telephone 105, a user can scroll through displayed names and phone numbers of other users within their own LAN (e.g., 301), or a LAN at another remote location across the WAN 201 (e.g., LAN 302). Once a particular name and phone number is found via the display (e.g., display 810), then that user can easily press a button key (e.g., on keyboard 807) to commence a telephone conversation with the user having the selected name and phone number. Naturally, using a workstation 106, such a listing of names and phone numbers can be viewed on the display screen. Additionally, using display 810 on the IP telephone 105, the same process can be accomplished. Alternatively, the names and phone numbers could be vocally listed over the speaker 821 on the IP telephone 105 as opposed to displaying the names and phone numbers on the IP telephone display 810.

One aspect of the present invention allows a user to manage names and phone numbers that are specific to that user. Entries into such a personal rolodex can be made either by pressing a key 807 on the IP telephone 105 while caller ID is being displayed, or by accessing a name adding function and inputting the information manually. Searching for a name in such a personal rolodex is accomplished by either pressing a dial pad key 807 associated with the first letter of the name or by pressing scroll keys 807 on the IP telephone 105. Once the name and number are displayed, a simple press of another key 807 will commence a telephone call to the displayed party.

A second feature permits a user to locate other telephone users within a LAN 301 by their name. Entries into such a station rolodex are made automatically when the LAN 301 is configured, and access can be restricted so that modifications cannot be made by a station user. Searching for a name in such a station rolodex is accomplished by either pressing a dial pad key 807 associated with the first letter of the name or by pressing the scroll keys 807. Once the name and number are displayed, the simple pressing of a key 807 again will call the displayed party's extension.

A system focused rolodex feature permits a user to locate and call a number contained in the system speed dial directory. Entries into such a system rolodex can be made automatically when the system is configured, and access by a particular station user can be restricted. Searching for a name in such a system rolodex is accomplished by either pressing a dial pad key 807 associated with the first letter of the name or by pressing the scroll keys 807 on the IP telephone 105. Again as before, once the name and phone number of the party are displayed, the press of a single key 807 can commence a telephone call to the displayed party's number.

A name adding function lets a station user manually add a name to their personal on-line rolodex as described above. Once such a name adding function is selected, the user is prompted to enter the name associated with this entry. The name is input by pressing the dial pad key 807 with the associated letter until the name is completely entered. The user can confirm the name entry by pressing a pound (#) key. The user can be next prompted to enter the telephone number to be associated with the name. The number is then confirmed again by pressing another key 807, such as a pound (#) key.

A site rolodex feature permits a user at an IP telephone extension to locate other phone systems on the WAN 201 by the site name. For example, referring to FIG. 3, the user at IP telephone 105 in LAN 301, can locate and access the site rolodex for LAN 302. Entries into each site rolodex can be made automatically when each system is configured. Searching for the name of a site using an IP telephone 105 can be accomplished by either pressing a dial pad key 807 associated with the first letter of the site name or by pressing the scroll keys 807. Once the site name/access code is displayed, pressing a dial pad key 807 again on the IP telephone 105 will allow the user to select either a station rolodex or a system rolodex associated with that site. This feature permits a user in one geographic location (e.g., Dallas) to locate a station user in another location (e.g., Detroit), without the need to reference a printed extension guide. In addition, the system rolodex can be used to locate and dial outside (speed dial) numbers specific to that system.

Figure 11:
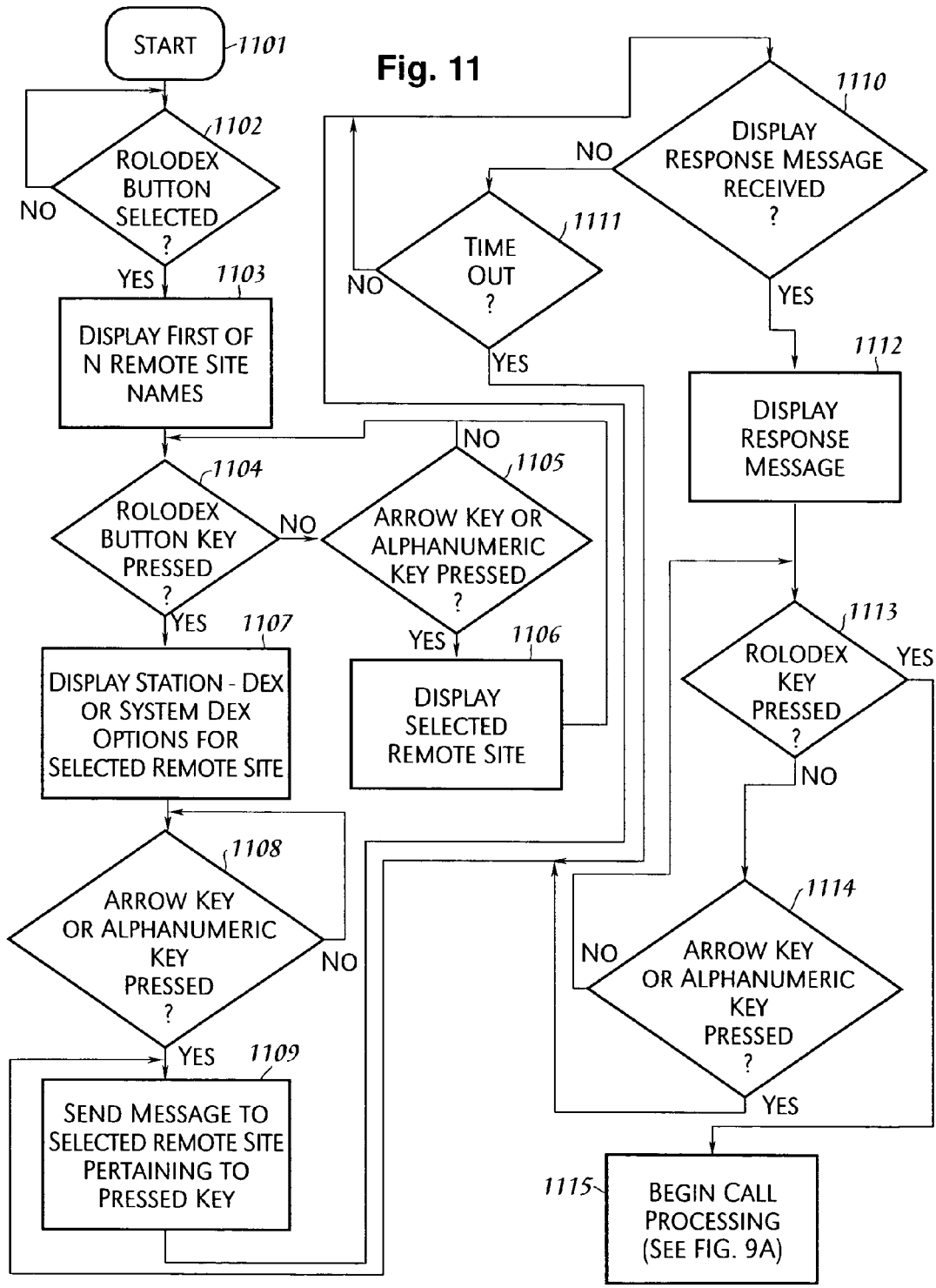
FIG. 11 illustrates a flow diagram in accordance with the present invention.
Figure 14:
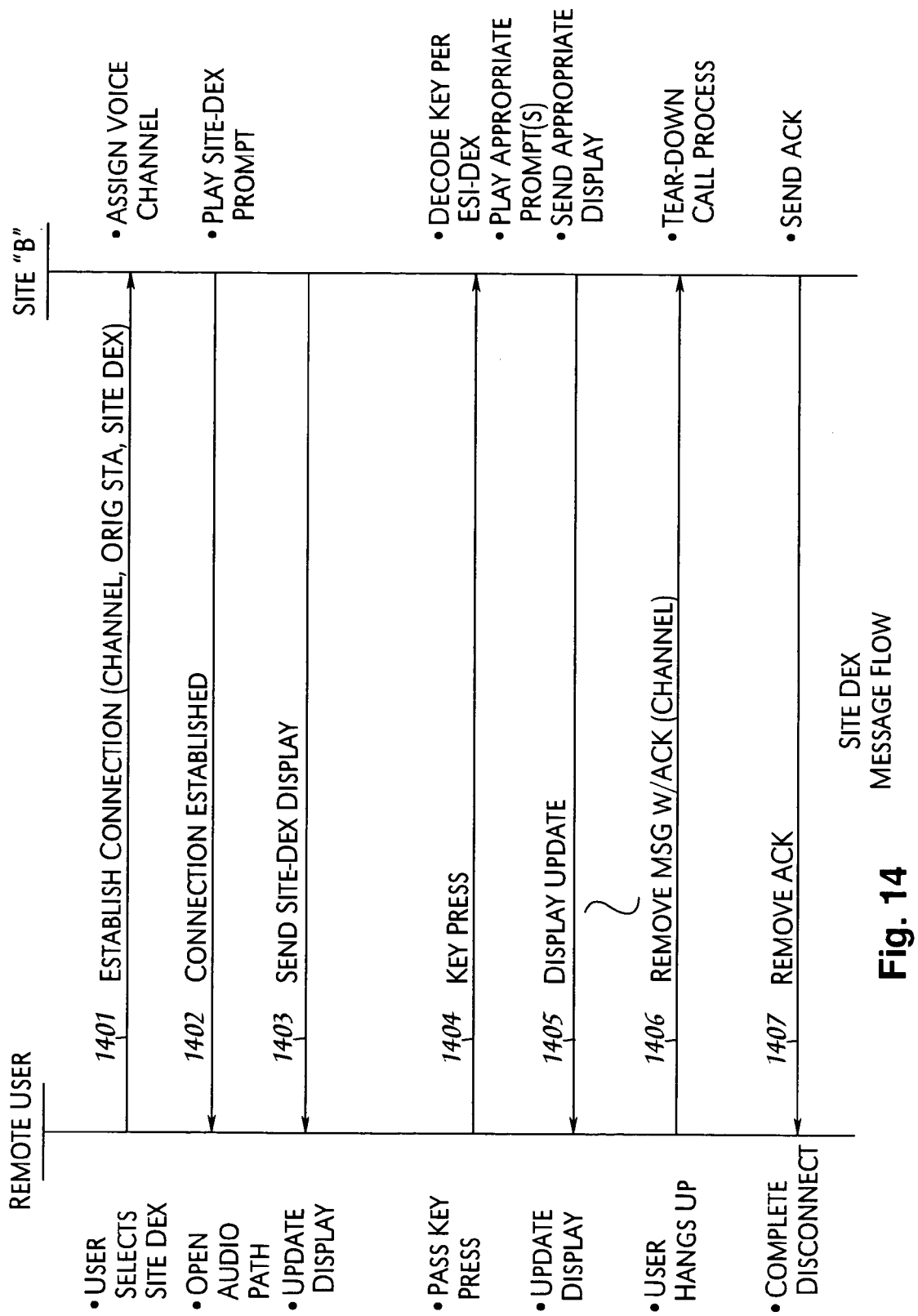
FIG. 14 illustrates a message flow over a WAN.

Referring to FIG. 11, a process performed on an IP telephone (e.g., telephone 105) starts at step 1101 and proceeds to step 1102 where it is determined whether or not a user has initiated selection of a rolodex for one of the sites within the WAN 201. For example, a user could press a dial pad key 807 on telephone 105 that is dedicated to accessing the rolodex functions. When the key 807 is pressed, the process proceeds to step 1103 to display the first one in a list of N remote sites within the telephone system network. For example, the first remote site to be listed could be Dallas 301. In step 1104, the process determines whether the dedicated rolodex key 807 has been pressed again. If not, then in step 1105, it is determined whether the user has pressed an alphanumeric key 807 or one of the scrolling arrow keys 807 on IP telephone 105. If the user presses one of the scroll keys 807, then the list will scroll through the various remote site names. For example, the next name to be displayed could be Detroit 302. Alternatively, the user could press an alphanumeric key 807 on IP telephone 105 to immediately proceed to a remote site within the list that begins with that alphanumeric symbol. When the user sees the selected remote site displayed, then the user can press the dedicated rolodex key 807 in step 1104, causing the process to proceed to step 1107 where the user is given the opportunity to select either the station rolodex or the system rolodex for that selected remote site. Selection of either the station rolodex or the system rolodex is performed in step 1108, by either the pressing of a scroll key 807 or an alphanumeric key 807. In response to such a selection, a message will be sent to the selected remote site in step 1109. This is illustrated by the Establish Connection message 1401 in FIG. 14 and the establishment of a connection between the two sites in step 1402. Step 1403 results in a display response message being received in step 1110 and this message being displayed in step 1112 on display 810 of IP telephone 105. A timeout function 1111 is provided should such a display response message not be received within a specified amount of time. The display response message 1112 will show the first entry in the station or system rolodex list selected by the user for that remote site (e.g., Detroit 302). For example, if the station rolodex list is shown for the remote site (e.g., Detroit 302), then the first name in that list and the associated telephone number will be displayed on the display 810 of IP telephone 105. If this is the extension that the user wishes to speak with, then the user will press the dedicated rolodex key 807 on IP telephone 105 in step 1113 (step 1404). If this is not the extension desired, then the user can use the arrow (scroll) or alphanumeric keys 807 on their IP telephone 105 in step 1114 to find the name and telephone number of the extension they wish to call. This is illustrated by steps 1404 and 1405 in FIG. 14.

Figure 9B:
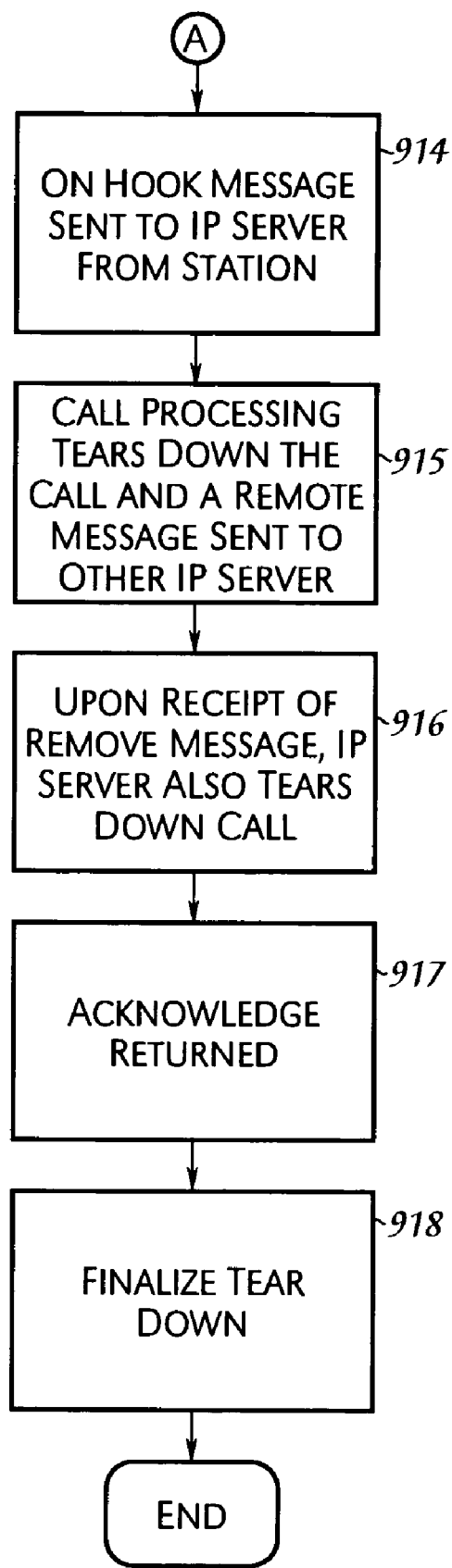

Once the user finds the name and telephone number of the extension they wish to call, then a pressing of the rolodex key 807 in step 1113 will cause the initiation of call processing in step 1115. Note, it is not necessary for the present invention that the user actually begin the call processing. Instead, a user can use the present invention merely to look up the telephone number associated with a user in another location. After call processing, which is further described below beginning with FIG. 9A, has been completed, then in FIG. 14, the telephone call can be torn down and completed in steps 1406 and 1407.

Figure 12:
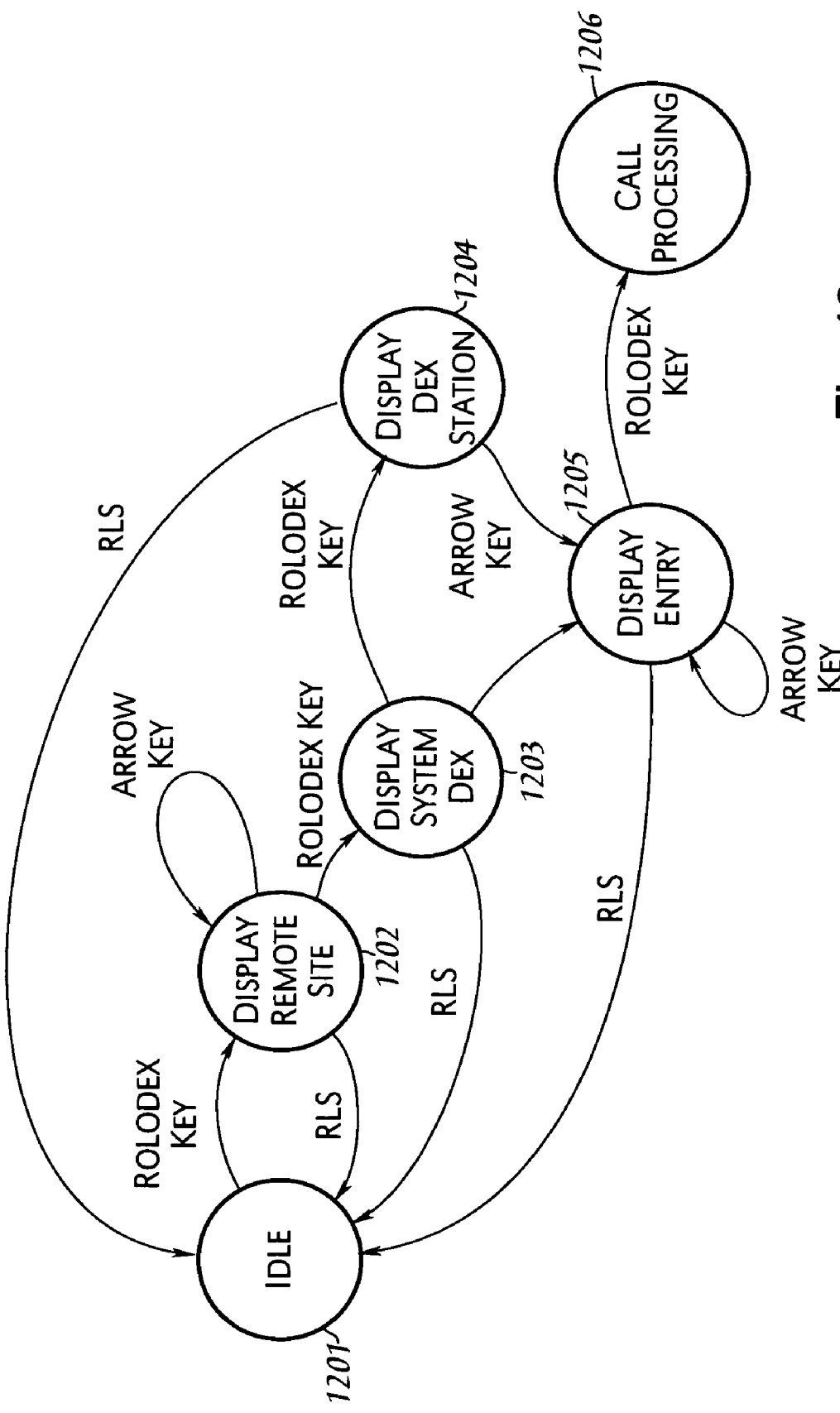
FIG. 12 illustrates a message flow diagram in accordance with the present invention.

FIG. 12 illustrates a state diagram associated with the IP telephone 105 for the process described above with respect to FIG. 11. In state 1201, the IP telephone 105 is in an idle state. When a user presses the dedicated rolodex key 807, state 1202 is entered where a remote site is displayed. The user can release (RLS) out of state 1202 back into state 1201. Alternatively, the arrow or alphanumeric keys can be pressed to scroll through the display of remote sites. Once the desired remote site is displayed, a pressing of the dedicated rolodex key 807 will move IP telephone 105 to state 1203 to display the system rolodex for that remote site. If the user wishes to view the station rolodex for that particular remote site, the user can press the dedicated rolodex key 807 to move to state 1204. In either the system or station rolodex list, the user can arrow through the list to display the various entries as shown in state 1205. Once a desired entry is displayed, the user can then again press the dedicated rolodex key 807 to begin call processing shown by state 1206.

Figure 15:
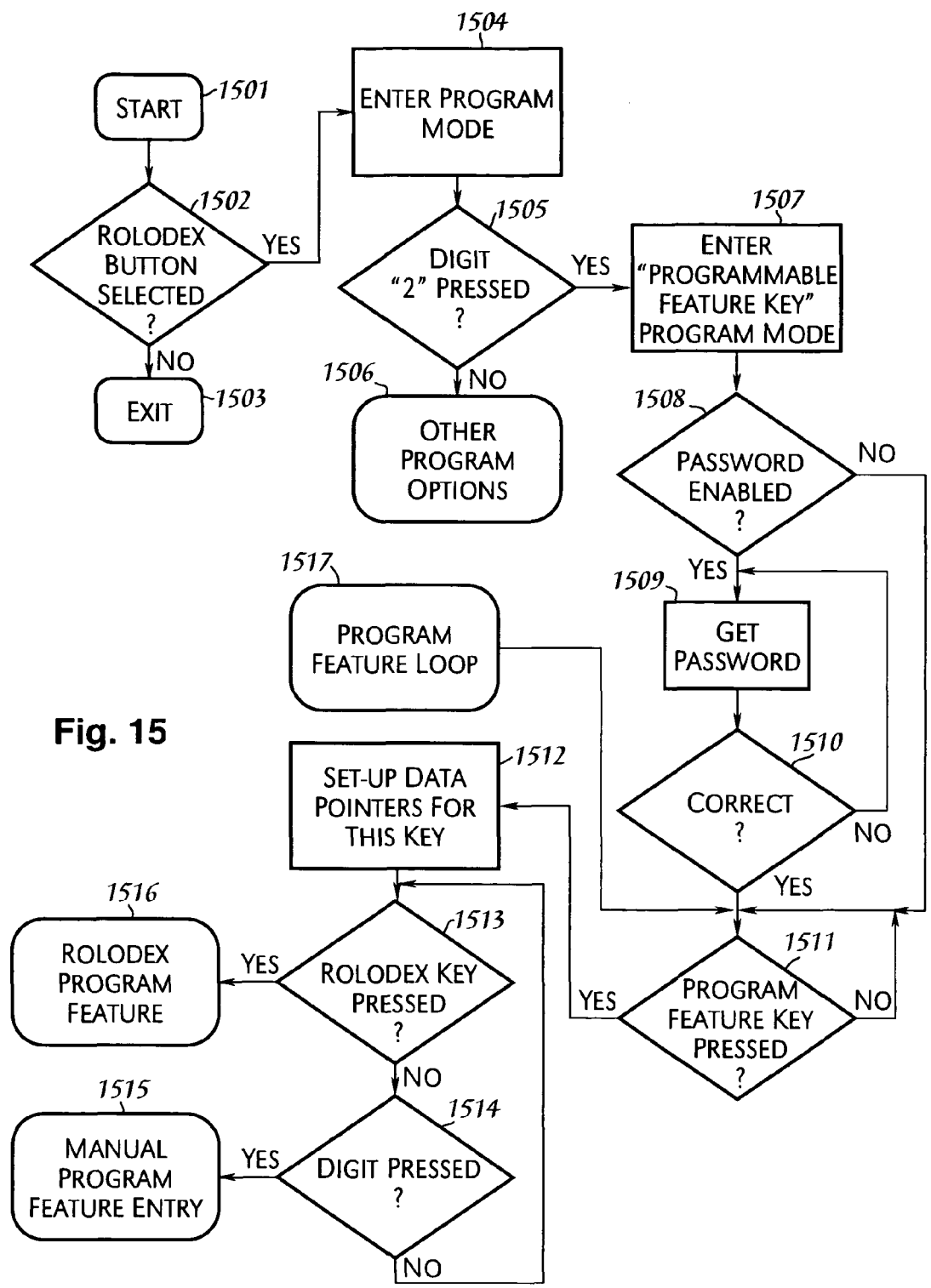
FIGS. 15-18 illustrate flow diagrams for programming a special purpose key on a telephone in accordance with an embodiment of the present invention.

Referring to FIG. 15, there is illustrated a process for programming a dedicated rolodex key, such as rolodex key 807. The process begins in step 1501 where a software program running within the system, e.g., system 301, monitors for incoming messages. IP telephones 105 send messages down their link to the call processing software. Therefore, when a button is pressed on the IP telephone 105, that is how call processing will know what button was being pressed. In this instance, in step 1502, when the program/help key is pressed, program mode will be entered in step 1504. If no program/help key is pressed, the process will exit in step 1503, or could optionally perform a return cycle to step 1502.

A telephone may have multiple modes. One mode is the normal mode where an IP telephone is unable to ring when an incoming call is present or to make outgoing calls. Another mode is the aforementioned programming mode, permitting certain features to be programmed for potential use on the IP telephone. Entering program mode 1504 takes the system out of normal call processing for that particular IP telephone, puts it into a do not disturb mode as far as the system's call processing is concerned with respect to that IP telephone, and associates that IP telephone with a separate application for programming features. Signals sent from the IP telephone 105 that is now in the program mode will be sent to the system, and will be recognized as signals pertaining to the programming mode.

For example, in step 1505, a particular digit, e.g., "2," might be pressed by the user of IP telephone 105. If so, a subprogram of the program mode will be entered in step 1507 whereby feature keys may be programmed. Pressing of a different digit in step 1505 may result in other program options being entered into in step 1506, which options are not discussed herein.

The system has the option of password protecting the telephone to ensure that another user finds it difficult to program the particular IP telephone 105. In step 1508, a determination is made whether the IP telephone 105 is password enabled. If not, then the process merely forwards to step 1511. However, if a password is required, then once the password is entered by the user in step 1509, it is checked to determine whether it is correct in step 1510 before the process proceeds to step 1511.

Step 1511 cycles waiting for a program feature key to be pressed. A program feature key is any key on IP telephone 105, which the user wishes to associate with a programmed function. Once a program feature key is pressed by the user, the process proceeds to step 1512 to set up data pointers for this particular feature key. What this means is that the process enters into a database to determine if there is a particular feature already associated with that feature key. If there is a feature associated with that feature key it will be displayed on the display 810 on IP telephone 105. In step 1513, if the rolodex key is pressed thereafter, then the process will proceed to step 1516 to enter into the rolodex program feature of the present invention, which is further described below with respect to FIG. 17. If instead of a particular rolodex key being pressed by the user, a digit is pressed in step 1514, then the manual program feature subprogram will be entered at step 1515, which subprogram is further described below with respect to FIG. 16.

Figure 16:
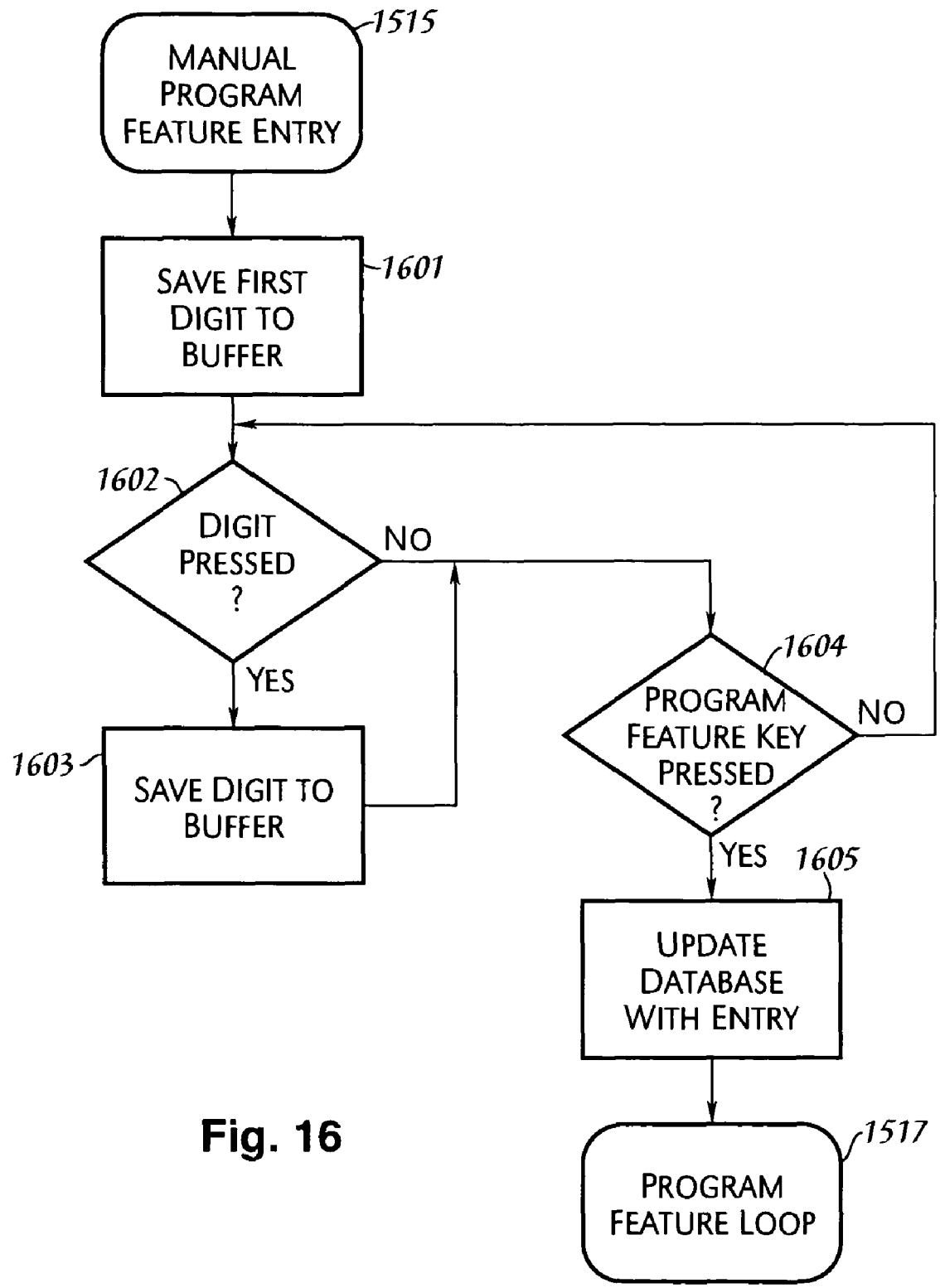

Proceeding to FIG. 16, the manual program feature entry subprogram 1515 is described wherein in step 1601, the first digit pressed by the user is saved to a buffer. In step 1602, a determination is made whether another digit is pressed. If yes, this additional digit is saved to the buffer in step 1603. Thereafter in step 1604, a determination is made whether a program feature key is pressed. If not, the process returns to step 1602. If a program feature key is pressed by the user in step 1604, the database will be updated with the program feature entry pressed by the user in step 1605. In step 1517, the process returns to the program feature loop of step 1517 in FIG. 15.

Returning to step 1516 in FIG. 15, the rolodex program feature subprogram provides an ability to automatically program a rolodex key. For example, if another person's extension number was desired to be programmed as a speed dialing key to one of the rolodex keys on the IP telephone 105, and the user of IP telephone 105 could not remember that person's extension number, the user could scroll through the company directory on the IP telephone until that particular person's name was displayed, and then a single key could be pressed to program that person's extension number to that particular rolodex key.

Figure 17A:
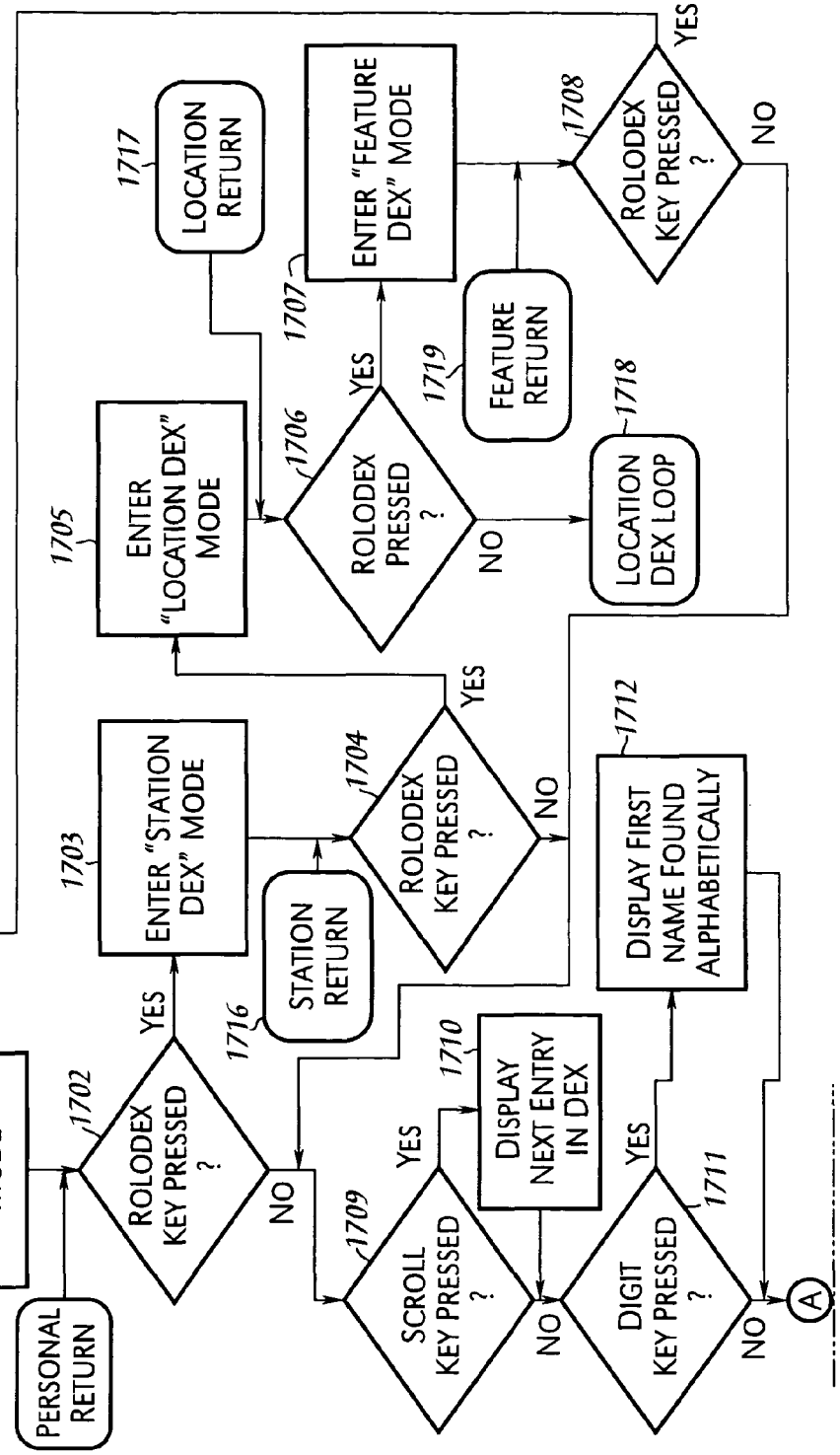
Figure 17B:
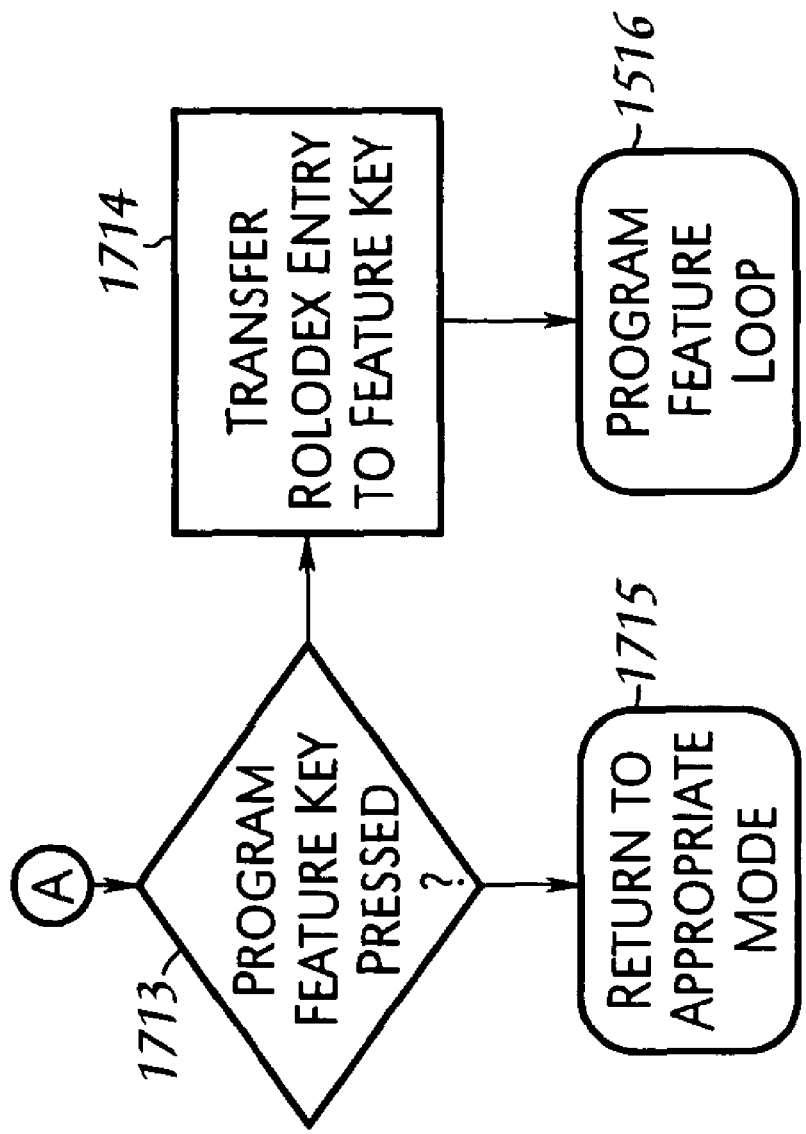

Moving to FIG. 17, the rolodex program feature 1516 is further described. Once this subprogram is entered, in step 1701, the personal rolodex mode may be automatically entered into. Such a personal rolodex mode may list the personal phone numbers associated with this particular IP telephone 105, whereby such a list of personal telephone numbers is not accessible to any other user within the telephone system. That is, only the user of IP telephone 105 may view and utilize their personal rolodex. If the rolodex key is pressed again in step 1702, then the system will enter the station rolodex mode in step 1703. If the rolodex key is pressed again in step 1704, then the system will enter into the location rolodex mode in step 1705. If the rolodex key is pressed again in step 1706, the system will enter the feature rolodex mode in step 1707. If the rolodex key is pressed again in step 1708, then the system will return to the personal rolodex mode in step 1701. As can be seen, these different rolodex modes can be cycled through by repeatedly pressing the rolodex key. If it is desired to be in the station rolodex mode 1703, then the user may scroll through all of the entries associated with the station rolodex. For example, this may be a list of all extension numbers that are stored within the entire phone system for that particular site, for example, Dallas 301 or Detroit 302. Scrolling through is performed using a scroll key commonly found on telephones whereby in step 1709 as each scroll key is pressed, the next entry within the station rolodex is displayed on display 810 in step 1710. Alternatively, a user may select a particular digit key in step 1711 whereby the first entry beginning with that particular digit key will be displayed in alphabetical format in step 1712. For example, if the numeral 3 is pressed, then the first entry beginning with the letter "D" will be illustrated. For example, the name and phone number of "John Davis" may be displayed.

As a result, if in step 1713, the program feature key is again pressed after a particular desired entry is displayed in either step 1710 or 1712, then this particular rolodex entry will be transferred to the program feature key in step 1714. For example, if the name and phone number of "John Davis" is displayed and the program feature key is then pressed in step 1713, then the name and telephone extension of John Davis will then be associated with this particular program feature key so that in the future, the user of IP telephone 105 can merely press this program feature key and automatically dial "John Davis." The same can be true for a personal rolodex entry so that a user may associate the name and telephone number of an entry within the personal rolodex associated with the IP telephone 105 to a particular program feature key.

If the feature rolodex mode is entered in step 1707, then the scroll keys or the pressing of a particular digit key can be used to display a desired feature in either step 1710 or 1712 to thereby program that particular feature to the desired program feature key using step 1713 and 1714. For example, the user may scroll through various programmable features being displayed on the IP telephone 105, such as the "DO NOT DISTURB" feature, which can then be programmed to be associated with a particular program feature key on the IP telephone 105. In this manner, the user of IP 105 can customize the operations of various programmable feature keys on the IP telephone 105.

The location rolodex mode 1705 permits a program feature key on IP telephone 105 to be automatically programmed to dial an extension in a remote site across the WAN 201. For example, a user of IP telephone 105 in Dallas 301 can go through the process now to be described to automatically associate a telephone extension associated with the LAN 302 in Detroit so that when the user presses that program feature key on their IP telephone 105 in Dallas 301, it will automatically dial the desired extension in the Detroit LAN 302, such as IP telephone 308. This can be done without the user of IP telephone 105 actually remembering that particular extension number, and instead the user of IP telephone 105 will merely scroll through the site or station specific entries associated with the Detroit LAN 302 until the desired entry is displayed on IP telephone 105 and then the program feature key is pressed in step 1713 to associate that particular extension for IP telephone 308 with that program feature key on IP telephone 105.

Figure 18:
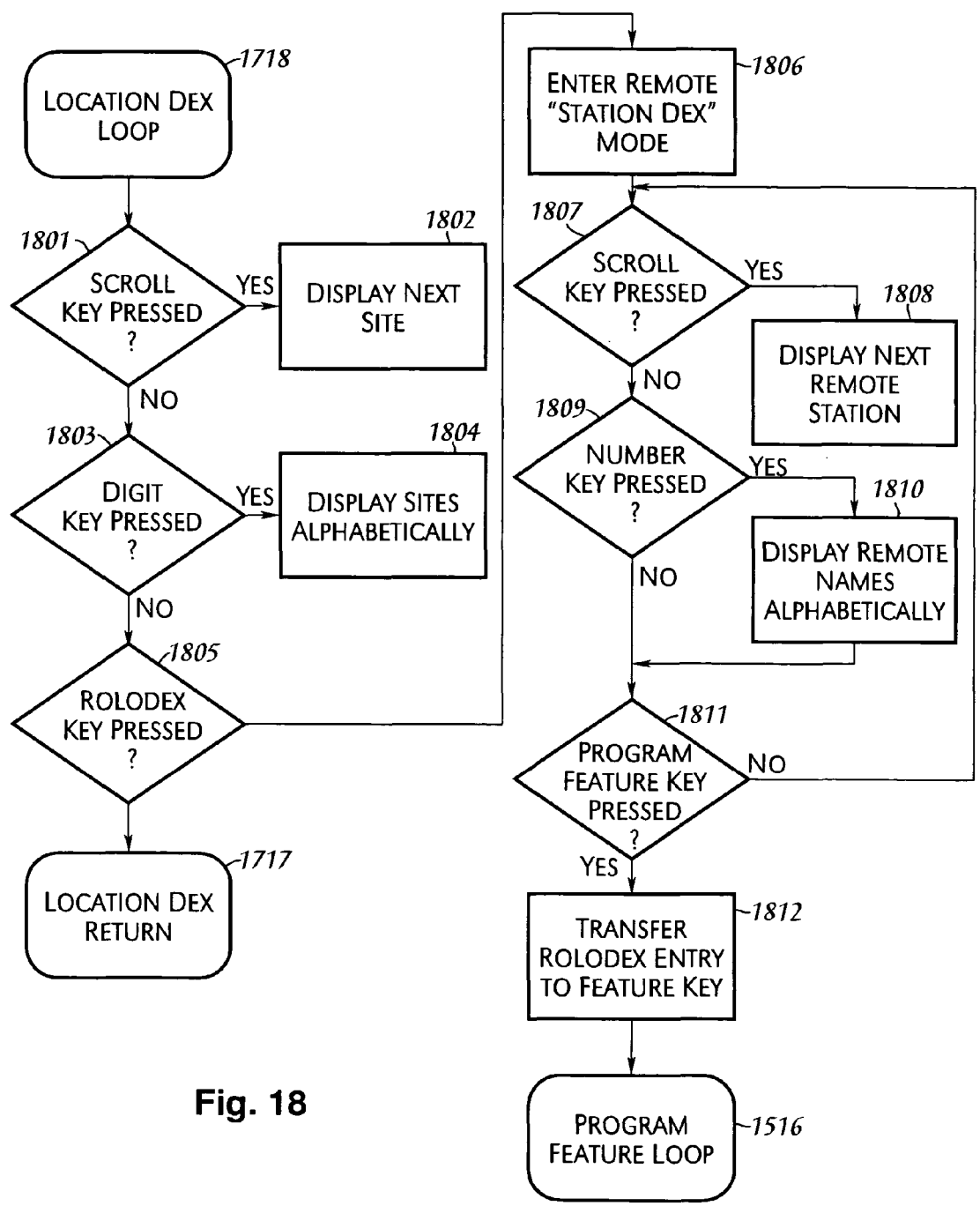

Once the location rolodex mode is entered into in step 1705, the process can proceed to the location rolodex loop 1718, which is further described with respect to FIG. 18. If the user presses one of the scroll keys on IP telephone 105 in step 1801, the user of IP telephone 105 can scroll through the various remote LANs coupled to LAN 301 over the WAN 201. For example, in step 1802, as the user repeatedly presses the scroll keys in step 1801, various LAN sites, e.g., Detroit LAN 302, are displayed on the display of IP telephone 105. Alternatively, steps 1803 and 1804 can be utilized by the user of IP telephone 105 to directly select a particular remote LAN. For example, in step 1803, the user of IP telephone 105 may press the "3" key on their IP telephone 105, which will display all remote LAN sites beginning with either the letters "D", "E", or "F." In this manner, the user of IP telephone 105 may eventually use steps 1801-1804 to eventually have the Detroit LAN 302 displayed on IP telephone 105. Once the desired remote LAN is displayed on IP telephone 105, then the user will press the rolodex key again in step 1805 to enter into the remote station rolodex mode of that particular selected LAN in step 1806. Upon entry of step 1806, the process permits the user of IP telephone 105 to remotely control the station rolodex mode at the selected remote site, which in this case may be Detroit LAN site 302. This is performed in a manner as similarly described above with respect to FIG. 14. When the user of IP telephone 105 selects the particular remote LAN site, a connection is established in step 1401, and some handshaking is performed as described above with respect to steps 1402 and 1403. As each key is pressed by the user of IP telephone 105, such as with respect to steps 1807 and/or 1809, these key presses are transferred to the remote site in step 1404, with an update of the display 810 of IP telephone 105 performed by step 1405. As a result, the user of IP telephone 105 may use a combination of scroll key presses and/or number digit key presses in steps 1807 and 1809 to eventually display a station rolodex entry from LAN 302 on the display 810 of IP telephone 105. For example, such key presses may be utilized to display the name and telephone extension of IP telephone 308. Once the desired name and/or extension is displayed, then the user can press the program feature key on IP telephone 105 in step 1811 to transfer that entry to be associated with that particular feature key in step 1812. With this process, the user of IP telephone 105 can automatically associate the name and extension number of telephone 308 with a desired program feature key on IP telephone 105. Thereafter, the user can then merely press such program feature key on IP telephone 105 to thereby call telephone 308 over the WAN 201.

FIGS. 9A-9C and FIG. 10 illustrate how call processing is performed between the remote sites when a user selects a remote extension to call in step 1113 of FIG. 11. In step 901, the originating station (e.g., IP telephone 105) goes off-hook with the pressing of the dedicated rolodex key (step 1113). In step 902, IP telephone 105 will dial the remote access code (e.g., 702) and extension number (e.g., 106) associated with the listed name and extension number on the display. In step 903, the IP server 101 will verify the remote access code for the remote site, assign an available voice compression channel in step 904, and in step 905, the IP server 101 will send a UDP/IP (User Datagram Protocol/Internet Protocol) message to the remote IP server 306 over the WAN 201. In step 906, upon receipt of the UDP/IP message, the remote IP server 306 determines if the extension number is valid. In step 907, if the extension number is valid, a return voice compression channel is assigned between IP server 101 and IP server 306. In step 908, normal call processing code is executed to ring the extension phone 308 from IP server 306. In step 909, the remote IP server 306 will send a connection established message to the originating IP server 101. In step 910, when the connection established message is received by the IP server 101, it will connect an audio path to the originating IP telephone 105 and send the updated information to the display of IP telephone 105. In step 911, when the called extension IP telephone 308 answers, an answering message is sent to the originating IP server 101. In step 912, the originating server 101 will then update the lamp/display of the originating station 105. Once the call has been completed and there is a hang-up in step 913, an on-hook message is sent to the IP server from the station in step 914. This will depend on which one of the telephones hung up first. In step 915, call processing then tears down the call and a remove is sent to the other IP server. In step 916, upon receipt of the remove message, the IP server also tears down the call and an acknowledge is returned in step 917. In step 918, the tear down of the call has been finalized.

Although the present invention and its advantages have been described in detail, it should be understood that various changes, substitutions and alterations can be made herein without departing from the spirit and scope of the invention as defined by the appended claims.

What is claimed is:

1. An information handling system comprising:
a first local area network ("LAN");
a second LAN;
a wide area network ("WAN") coupling the first LAN to the second LAN;
a third LAN coupled to the first and second LANs via the WAN;
a first telecommunications device coupled to the first LAN;
a plurality of telecommunications extensions coupled to the second LAN;
the first LAN including first circuitry for enabling a user of the first telecommunications device to observe a list of the plurality of telecommunications extensions;
the first LAN including second circuitry for automatically calling one of the plurality of telecommunications extensions in response to the user selecting one of the plurality of telecommunications extensions from the observed list, wherein the list of the plurality of telecommunications extensions is stored in a server in the second LAN, and is accessed by the first circuitry across the WAN; and
a plurality of telecommunications extensions coupled to the third LAN, the first LAN including circuitry for enabling the user to select between observing the list of the plurality of telecommunications extensions coupled to the second LAN or observing a list of the plurality of telecommunications extensions coupled to the third LAN.

2. The system as recited in claim 1, wherein communication among the first LAN, second LAN, and WAN uses an IP protocol.

3. The system as recited in claim 2, wherein the list of the plurality of telecommunications extensions is displayed to the user of the first telecommunications device.

4. The system as recited in claim 3, wherein the first telecommunications device is an IP telephone having a display for showing the list of the plurality of telecommunications extensions, wherein the second circuitry includes a key for enabling the user to tacitly selecting one of the plurality of telecommunications extensions from the displayed list.

5. The system as recited in claim 4, wherein the tactile selection of one of the plurality of telecommunications extensions from the displayed list by the user results in an initiation of a call from the first telecommunications device to the selected one of the plurality of telecommunications extensions across the WAN.

6. The system as recited in claim 1,
wherein the list of the plurality of telecommunications extensions is played as audio to the user of the first telecommunications device.

7. The system as recited in claim 1, wherein the first telecommunications device includes circuitry for enabling the user to scroll through the displayed list of the plurality of telecommunications extensions.

8. An information handling system comprising:
a first local area network ("LAN") operating under an IP protocol;
a first IP telephone coupled to the first LAN, the first IP telephone having a display and a set of keys for enabling a user to enter inputs;
a second LAN operating under the IP protocol;
second and third telephone extensions coupled to the second LAN;
a wide area network ("WAN") operating under the IP protocol coupling the first LAN to the second LAN;
a third LAN coupled to the first and second LANs via the WAN;
the first LAN including first circuitry for enabling a user of the first IP telephone to view a list including the second and third telephone extensions, wherein the list is stored in a server in the second LAN, and is accessed by the first circuitry across the WAN; and
a plurality of telephone extensions coupled to the third LAN, the first LAN including circuitry for enabling the user to select between viewing the list of the telephone extensions coupled to the second LAN or viewing a list of the plurality of telephone extensions coupled to the third LAN.

9. The system as recited in claim 8, further comprising:
the first LAN including second circuitry for automatically calling the second telephone extension in response to the user selecting the second telephone extension from the viewed list.

10. The system as recited in claim 9, wherein selection of the second telephone extension from the viewed list by the user is accomplished by selection of one of the set of keys.

11. The system as recited in claim 10, wherein the selection of one of the set of keys results in an initiation of a call from the first IP telephone to the second telephone extension across the WAN.

12. The system as recited in claim 8, wherein the first IP telephone includes circuitry for enabling the user to scroll through the displayed list.

13. A telecommunications system comprising:
a first IP telephone coupled to a first IP server within a first LAN;
second and third telephone extensions coupled to a second IP server within a second LAN;
a WAN coupling the first LAN to the second LAN, the first LAN, the second LAN, and the WAN communicating using an IP protocol;
a third LAN coupled to the first and second LANs via the WAN;
means for displaying on the first IP telephone a list of telephone destinations stored in the second IP server in response to selection of a first input on the first IP telephone, wherein the list of telephone destinations is communicated from the second IP server over the WAN to the first IP telephone;
means for automatically dialing the selected one of the telephone destinations for a communications link between the first IP telephone and the selected one of the telephone destinations in response to selection of one of the telephone destinations from the displayed list, wherein the selection of one of the telephone destinations from the displayed list is performed in response to selection of a second input on the first IP telephone by a user;
means for displaying on the first IP telephone a list of LANs coupled to the WAN, including the second and third LANs; and
means for displaying the first list in response to selection of the second LAN from the displayed list of LANs.

14. The system as recited in claim 13, wherein the first and second inputs are the same key button on the first IP telephone.

15. The system as recited in claim 14, wherein the telephone destinations include the second and third telephone extensions coupled to the second IP server.

16. The system as recited in claim 14, wherein the telephone destinations include telephones external to the system.

17. A method comprising the steps of:
receiving a first touch input from a user on an IP telephone that is networked into a first LAN operating under an IP protocol;
in response to receipt of the first touch input, displaying on a display on the IP telephone a first list including second and third LANs coupled to the first LAN, wherein the second and third LANs operate under the IP protocol, wherein the first, second, and third LANs are coupled via a WAN;
receiving a second touch input from the user on the IP telephone;
in response to receipt of the second touch input, displaying on the display on the IP telephone a second list of telephone destinations accessible from the second LAN;
receiving a third touch input from the user on the IP telephone;
in response to receipt of the third touch input, automatically dialing one of the telephone destinations accessible from the second LAN for a communications connection between the one of the telephone destinations and the IP telephone, wherein the step of displaying on the display on the IP telephone the second list further includes the steps of:
sending a message from the first LAN to the second LAN requesting the second list; and
receiving the second list from the second LAN to the first LAN;
receiving a fourth touch input from the user on the IP telephone; and
in response to receipt of the fourth touch input, displaying on the display on the IP telephone a third list of telephone destinations accessible from the third LAN, wherein the step of displaying on the display on the IP telephone the third list further includes the steps of:
sending a message from the first LAN to the third LAN requesting the third list; and
receiving the third list from the third LAN to the first LAN.

18. The method as recited in claim 17, before the step of receiving the second touch input, further comprising the steps of: receiving a fifth touch input from the user on the IP telephone; and in response to receipt of the fifth touch input, scrolling through the first list.

19. The method as recited in claim 18, before the step of receiving the third touch input, further comprising the steps of: receiving a sixth touch input from the user on the IP telephone; and in response to receipt of the sixth touch input, scrolling through the second list.

* * * * *